(12) United States Patent
Kono

(10) Patent No.: US 7,994,262 B2
(45) Date of Patent: Aug. 9, 2011

(54) HARDENABLE COMPOSITION

(75) Inventor: Yoshiyuki Kono, Akashi (JP)

(73) Assignee: Kaneka Corporation, Osaka (JP)

( * ) Notice: Subject to any disclaimer, the term of this patent is extended or adjusted under 35 U.S.C. 154(b) by 522 days.

(21) Appl. No.: 10/587,196

(22) PCT Filed: Jan. 26, 2005

(86) PCT No.: PCT/JP2005/001024
§ 371 (c)(1),
(2), (4) Date: Jan. 23, 2007

(87) PCT Pub. No.: WO2005/073322
PCT Pub. Date: Aug. 11, 2005

(65) Prior Publication Data
US 2007/0173620 A1 Jul. 26, 2007

(30) Foreign Application Priority Data
Jan. 30, 2004 (JP) ................................ 2004-024171

(51) Int. Cl.
*C08G 77/04* (2006.01)
(52) U.S. Cl. ............. 525/477; 528/33; 528/34; 528/901
(58) Field of Classification Search .................. 525/474, 525/477; 528/33, 34, 901
See application file for complete search history.

(56) References Cited

U.S. PATENT DOCUMENTS

| | | | | |
|---|---|---|---|---|
| 4,983,700 A | * | 1/1991 | Yukimoto et al. | 528/34 |
| 5,403,881 A | * | 4/1995 | Okawa et al. | 524/261 |
| 7,115,696 B2 | * | 10/2006 | Roesler et al. | 528/28 |
| 2004/0198885 A1 | | 10/2004 | Okamoto et al. | |

FOREIGN PATENT DOCUMENTS

| | | |
|---|---|---|
| EP | 0 485 057 A1 | 5/1992 |
| EP | 1 285 946 A1 | 2/2003 |
| JP | HEI-3-47825 | 2/1991 |
| JP | HEI-3-72527 | 3/1991 |
| JP | 05-059267 A | 3/1993 |
| JP | 2003-96195 | 4/2003 |
| JP | 2003-096195 A | 4/2003 |
| JP | 2003-313302 A | 11/2003 |
| WO | WO 03/000749 A1 | 1/2003 |
| WO | WO 2003/000749 A1 | 1/2003 |
| WO | WO 03/011978 A1 | 2/2003 |
| WO | WO 2003/011978 A1 | 2/2003 |

* cited by examiner

*Primary Examiner* — Margaret Moore
(74) *Attorney, Agent, or Firm* — Sughrue Mion, PLLC

(57) ABSTRACT

The present invention has its object to provide a reactive silyl group-containing room temperature curable composition which can give cured products having good recovery, durability and creep resistance and the mechanical physical properties of which can be adjusted so as to be adequate for the use as a sealing material or adhesive and, further, which is low in viscosity and good in workability. This object can be achieved by, for example, a curable composition which comprises an organic polymer (A) containing reactive silyl groups represented by the general formula (1) given below wherein a is 3 and an organic polymer (B) containing an average of 0.5 to 1.5 reactive silyl groups represented by the general formula (1) given below per molecule $$—Si(R^1_{3-a})X_a \qquad (1).$$

13 Claims, 1 Drawing Sheet

HARDENABLE COMPOSITION

TECHNICAL FIELD

The present invention relates to a room temperature curing composition that can be cured in the presence of moisture. More particularly, it relates to a curable composition which comprises an organic polymer having reactive silicon-containing functional groups crosslinkable under siloxane bond formation.

BACKGROUND ART

The technology of curing organic polymers having reactive silyl groups (reactive silicon-containing functional groups capable of being crosslinked under siloxane bond formation in the manner of hydrolysis and condensation reactions) for use as sealing agents, adhesives or the like is well known in the art and is an industrially useful technology.

Among such compounds, polymers whose main chain is an oxyalkylene polymer, polyisobutylene polymer or (meth) acrylic polymer, in particular, occur as liquids at room temperature and are used in sealing materials or adhesives, among others, since the cured products derived therefrom have low modulus and high elongation characteristics.

As reactive silyl group-terminated moisture-curable polymers, there are known, among others, polymers resulting from introduction of a reactive silyl group-containing compound into unsaturated terminal groups of an oxyalkylene polymer in the manner of hydrosilylation (cf. Japanese Kokai Publication Hei03-72527) and polymers obtained by reacting a reactive silyl group-containing isocyanate compound with terminal hydroxyl groups of an oxyalkylene polymer (cf. Japanese Kokai Publication Hei03-47825).

However, cured products obtained from an organic polymer having reactive silyl groups containing three hydrolysable groups per silicon atom tend to be very fragile and low in extensibility. Further, when the molecular weight is increased to secure the extensibility, the problem of viscosity increase arises.

Thus, it has been earnestly desired that the cured products derived from an organic polymer having reactive silyl groups containing three hydrolysable groups per silicon atom be improved in mechanical physical properties and reduced in viscosity.

SUMMARY OF THE INVENTION

In view of the problems discussed above, it is an object of the present invention to provide a reactive silyl group-containing room temperature curable composition which is low in viscosity and good in workability and the mechanical physical properties of which can be adjusted so as to be adequate for the use thereof as a sealing material or adhesive, without impairing the recovery, durability and creep resistance of the cured products obtained therefrom.

The present inventors made intensive investigations concerning the above problems and, as a result, accomplished the object mentioned above by providing the following.

1) A curable composition
which comprises an organic polymer (A) containing reactive silyl groups represented by the general formula (1) given below wherein a is 3 and an organic polymer (B) containing an average of 0.5 to 1.5 reactive silyl groups represented by the general formula (1) given below per molecule.

$$-Si(R^1_{3-a})X_a \quad (1)$$

[wherein $R^1$ represents an alkyl group containing 1 to 20 carbon atoms, an aryl group containing 6 to 20 carbon atoms, an aralkyl group containing 7 to 20 carbon atoms or a triorganosiloxy group represented by $(R')_3SiO-$ (in which the three R' groups may be the same or different and each represents a monovalent hydrocarbon group containing 1 to 20 carbon atoms) and, when there are two or more $R^1$ groups, they may be the same or different, and X represents a hydroxyl group or a hydrolysable group and, when there are two or more X groups, they may be the same or different, and a represents 1, 2 or 3].

2) The curable composition according to 1),
wherein the reactive silyl group in the organic polymer (B) is a reactive silyl group represented by the general formula (1) in which a is 2.

3) The curable composition according to 1),
wherein the reactive silyl group in the organic polymer (B) is a reactive silyl group represented by the general formula (1) in which a is 3.

4) The curable composition according to 1), 2) or 3),
wherein the organic polymer (B) is a polymer obtained by reacting the above-mentioned organic polymer with a compound containing both a functional group capable of reacting with the reactive group in the above-mentioned organic polymer and a reactive silyl group represented by the general formula (1) in a compound-to-polymer mole ratio of not lower than 0.5 and not higher than 1.5.

5) The curable composition according to any of 1) to (4),
wherein the main chain of each of the organic polymers (A) and (B) is an oxyalkylene polymer.

6) The curable composition according to any of 1) to 5),
wherein the organic polymer (B) contains substantially one reactive silyl group represented by the general formula (1) per molecule.

7) The curable composition according to any of 1) to 6),
wherein the organic polymer (B) has a molecular weight of not higher than 8,000.

8) The curable composition according to any of 1) to 7),
wherein the organic polymer (B) contains no urethane bond or urea bond within the molecule.

9) The curable composition according to any of 1) to 8),
wherein the organic polymer (A) contains no urethane bond or urea bond within the molecule.

10) The curable composition according to any of 1) to 9),
wherein the molecular weight of the organic polymer (B) is lower than the molecular weight of the organic polymer (A) by not less than 1,000.

EFFECT OF THE INVENTION

The curable composition of the invention is a reactive silyl group-containing room temperature curable composition which can give cured products having good recovery, durability and creep resistance and the mechanical physical properties of which can be adjusted so as to be adequate for the use as a sealing material or adhesive and, further, which is low in viscosity and good in workability.

DETAILED DESCRIPTION OF THE INVENTION

Figure 1:
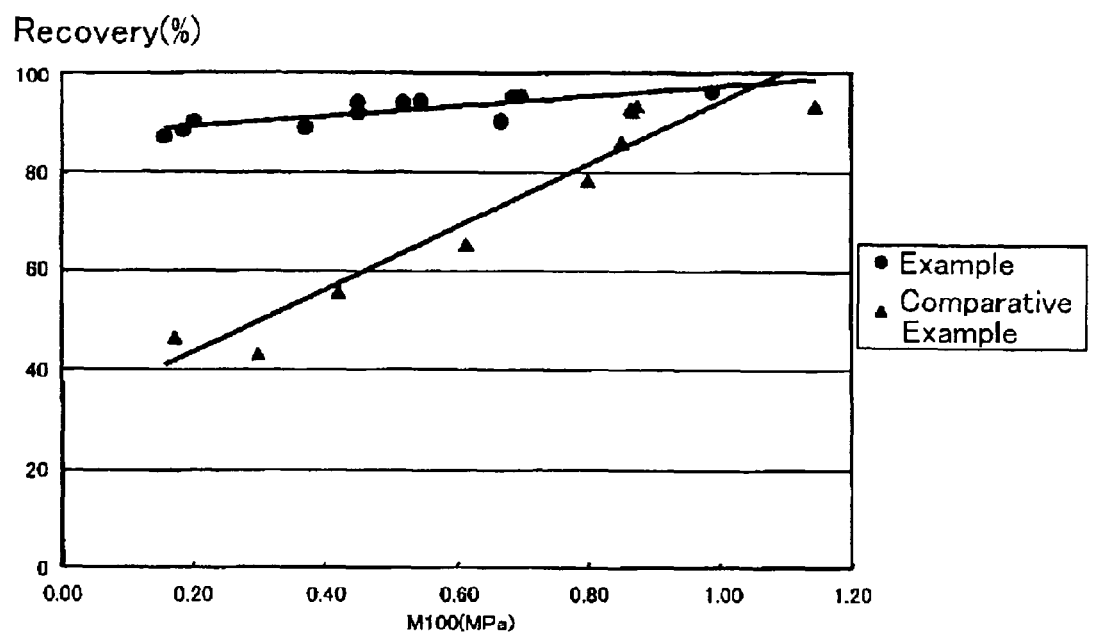
FIG. 1 This FIGURE is a representation of the modulus (M100)-versus-recovery relations for the cured products obtained in the examples and comparative examples.

Among the reactive silyl groups represented by the following general formula (1), the reactive silyl group essential in the organic polymer (A) in the practice of the invention is a group of formula (1) in which a is 3.

(In the formula, $R^1$ represents an alkyl group containing 1 to 20 carbon atoms, an aryl group containing 6 to 20 carbon atoms, an aralkyl group containing 7 to 20 carbon atoms or a triorganosiloxy group represented by $(R')_3SiO—$ (in which the three R' groups may be the same or different and each represents a monovalent hydrocarbon group containing 1 to 20 carbon atoms) and, when there are two or more $R^1$ groups, they may be the same or different, and X represents a hydroxyl group or a hydrolysable group and, when there are two or more X groups, they may be the same or different, and a represents 1, 2 or 3.)

The hydrolysable group represented by X in the above formula is not particularly restricted but any of those hydrolysable groups known in the art can be suitably used. Specifically, a hydrogen atom, halogen atoms, alkoxy groups, acyloxy groups, ketoximate groups, an amino group, an amido group, acid amide groups, an aminoxy group, a mercapto group and alkenyloxy groups are preferred and, from the mild hydrolyzability and easy handleability viewpoint, alkoxy groups such as methoxy and ethoxy are particularly preferred.

The reactive silyl group is not particularly restricted but trialkoxy groups are preferred in view of their high susceptibility to hydrolysis and of their mild hydrolyzability and easy handleability; at least one species selected from the group consisting of trimethoxysilyl, triethoxysilyl and triisopropenyloxysilyl groups is preferred as the specific functional group species. More specifically, trimethoxysilyl and triethoxysilyl groups are preferred. When trialkoxysilanes are used, the improving effects of the organic polymer (A) on the recovery, durability and creep resistance of the curing composition or cured products are particularly remarkable.

The organic polymer (A) preferably contains an average of at least 1, more preferably 1.1 to 5, still more preferably 1.2 to 5, reactive silyl groups per molecule. When the average number of reactive silyl groups contained in each molecule of the organic polymer (A) is smaller than 1, the curability becomes insufficient, good rubber elasticity can hardly be imparted, and the recovery, durability and creep resistance of the cured products can hardly be manifested. The reactive silyl group may occur either at the terminus of or internally within the molecular chain of the organic polymer (A). When the reactive silyl group occurs at the molecular chain terminus, the effective network chain content in the organic polymer (A) component contained in the finally formed cured products becomes high and, therefore, it becomes easy to obtain rubber-like cured products showing high strength, high elongation and low elasticity.

The organic polymer (A) to be used in the practice of the invention may contain a reactive silyl group of the general formula (1) in which a is 2 in addition to the reactive silyl group of the general formula (1) in which a is 3.

(Reactive Silyl Group Introduction)

The method of introducing such a reactive silyl group into the polymer is not particularly restricted but various methods can be used. For example, there may be mentioned:

I) The method which comprises applying the hydrosilylation reaction, namely reacting an organic polymer having an alkenyl or like unsaturated group with a reactive silyl group-containing hydrosilane compound in the presence of a group 8 transition metal catalyst;

II) The method which comprises reacting an organic polymer containing a reactive group such as hydroxyl, epoxy or isocyanato group with a compound containing both a functional group reactive with such reactive group and a reactive silyl group (e.g. reacting a hydroxyl group-containing organic polymer with an isocyanatosilane); and III) The method which comprises reacting an organic polymer containing an alkenyl or like unsaturated group with a compound containing both a reactive silyl group and a mercapto group.

Among these, the method (I) is preferred from the residual material removability and reactivity viewpoint. The method (I) is preferred also in view of the nonoccurrence of a structure possibly causing a decrease in thermal stability, for example a urethane or urea bond.

The method of producing the above-mentioned alkenyl- or like unsaturated group-terminated organic polymer may be any of those methods known in the art. For example, mention may be made of the method comprising reacting a hydroxyl-terminated organic polymer with an alkenyl group-containing compound for binding them together under formation of an ether, ester, urethane, carbonate or like bond. In the case of introducing an alkenyl group via ether bonding, for instance, there may be mentioned the method comprising converting the hydroxyl terminus of an organic polymer to such an oxymetal group as —ONa or —OK and then reacting therewith an unsaturated group-containing compound represented by the general formula (2):

or the general formula (3):

wherein $R^2$ is a divalent organic group containing 1 to 20 carbon atoms, $R^3$ is a hydrocarbon group containing not more than 10 carbon atoms and Y is a halogen atom.

As the method of converting the terminal hydroxyl group to an oxymetal group, there may be mentioned, for example, the method comprising reacting with an alkali metal such as Na or K; a metal hydride such as NaH; a metal alkoxide such as $NaOCH_3$; or an alkali hydroxide such as NaOH or KOH, for instance.

As specific examples of the unsaturated group-containing compound represented by the general formula (2) or (3), there may be mentioned, among others, $CH_2=CH—CH_2—Cl$, $CH_2=CH—CH_2—Br$, $CH_2=CH—C_2H_4—Cl$, $CH_2=CH—C_2H_4—Br$, $CH_2=CH—C_3H_6—Cl$, $CH_2=CH—C_3H_6—Br$, $CH_2=C(CH_3)—CH_2—Cl$, $CH_2=C(CH_3)—CH_2—Br$, $CH_2=C(CH_2CH_3)—CH_2—Cl$, $CH_2=C(CH_2CH_3)—CH_2—Br$, $CH_2=C(CH_2CH(CH_3)_2)—CH_2—Cl$ and $CH_2=C(CH_2CH(CH_3)_2)—CH_2—Br$. From the reactivity viewpoint, in particular, $CH_2=CH—CH_2—Cl$ and $CH_2=C(CH_3)—CH_2—Cl$ are preferred.

For such unsaturated group introduction, use may also be made of isocyanate compounds, carboxylic acid compounds and epoxy compound, for instance, containing such a group as $CH_2=CH—CH_2—$ or $CH_2=C(CH_3)—CH_2—$.

A reactive silyl group is further introduced, in the manner of hydrosilylation, into the organic polymer after alkenyl group introduction using the above compound. The group 8 transition metal catalyst to be used on that occasion is, for example, a metal complex catalyst the metal component of which is selected from among such group 8 transition elements as platinum, rhodium, cobalt, palladium and nickel. Usable are, for example, such compounds as $H_2PtCl_6 \cdot 6H_2O$, platinum-vinylsiloxane complexes, platinum-olefin complexes, metallic Pt, $RhCl(PPh_3)_3$, $RhCl_3$, $Rh/Al_2O_3$, $RuCl_3$, $IrCl_3$, $FeCl_3$, $PdCl_2 \cdot 2H_2O$, and $NiCl_2$. From the hydrosilylation reactivity viewpoint, one of $H_2PtCl_6 \cdot 6H_2O$, platinum-vinylsiloxane complexes and platinum-olefin complexes is particularly preferred.

Such production methods are described in Japanese Patent No. 1396791, Japanese Patent No. 1727750, Japanese Patent No. 2135751 and Japanese Kokai Publication Hei03-72527, for instance.

As the hydrosilane compound to be used in the above hydrosilylation reaction, there may generally be mentioned halosilanes such as trichlorosilane and methyldichlorosilane; trialkoxysilanes such as trimethoxysilane and triethoxysilane; and alkyldialkoxysilanes such as methyldimethoxysilane and ethyldiethoxysilane, among others. The hydrosilane compound to be used in producing a polymer (A) containing a reactive silyl group of the general formula (1) in which a is 3 includes, but is not limited to, trichlorosilane and trialkoxysilanes such as trimethoxysilane and triethoxysilane. Among these, trialkoxysilanes are particularly preferred in view of their hydrolyzability, mild reactivity, storage stability and the like.

Among the trialkoxysilanes mentioned above, such trialkoxysilanes as trimethoxysilane containing one or more alkoxy groups containing 1 carbon atom (i.e. methoxy group), may undergo a rapid disproportionation reaction and, when such disproportionation reaction proceeds, fairly dangerous compounds such as dimethoxysilane are formed. From the safety in handling viewpoint, trialkoxysilanes whose alkoxy groups contain 2 or more carbon atoms are preferably used. In applying the hydrosilylation reaction mentioned above under I), the use of triethoxysilane is most preferred in view of its availability, safety in handling and the recovery, durability and creep resistance of the curing composition or cured products.

As for II), there may be mentioned, for example, the method comprising reacting a polymer containing a terminal hydroxyl group as a reactive group with a compound containing an isocyanato group, which is reactive with the hydroxyl group, and a reactive silyl group. More specifically, such method includes, but is not limited to, the method described in Japanese Kokai Publication Hei03-47825. The isocyanato group- and reactive silyl group-containing compound generally includes, but is not limited to, γ-isocyanatopropyltrimethoxysilane, γ-isocyanatopropylmethyldimethoxysilane, γ-isocyanatopropyltriethoxysilane and γ-isocyanatopropylmethyldiethoxysilane as specific examples, and the compound to be used in producing a polymer (A) containing a reactive silyl of the general formula (1) in which a is 3 includes, but is not limited to, γ-isocyanatopropyltrimethoxysilane and γ-isocyanatopropyltriethoxysilane.

The method III) includes, but is not limited to, the method comprising introducing a mercapto group- and reactive silyl group-containing compound into an unsaturated bond site in an organic polymer in the manner of radical addition in the presence of a radical initiator and/or radical-generating source, for instance. The mercapto group- and reactive silyl group-containing compound generally includes, γ-mercaptopropyltrimethoxysilane, γ-mercaptopropylmethyldimethoxysilane, γ-mercaptopropyltriethoxysilane and γ-mercaptopropylmethyldiethoxysilane as specific examples, and the compound to be used in producing a polymer (A) containing a reactive silyl of the general formula (1) in which a is 3 includes, but is not limited to, γ-mercaptopropyltrimethoxysilane and γ-mercaptopropyltriethoxysilane.

A silane compound in which three hydrolysable groups are bound to one silicon atom, for example trimethoxysilane, may undergo the so-called disproportionation reaction, as mentioned above and, in the case of trialkoxysilanes containing one or more alkoxy groups containing 1 carbon atom (methoxy group), for example trimethoxysilane, the disproportionation reaction may proceed rapidly in some instances. When such disproportionation reaction proceeds, fairly dangerous compounds such as dimethoxysilane are formed. With γ-mercaptopropyltrimethoxysilane or γ-isocyanatopropyltrimethoxysilane, however, such disproportionation reaction will not proceed. Therefore, when a methoxy group-containing trialkoxysilyl group, for example trimethoxysilyl, is employed as the silyl group, the synthetic method II) or III) is preferably used.

Even by the method I), it is still possible to introduce triethoxysilane into an organic polymer and then subject the ethoxy groups to transesterification using a methanol and a transesterification catalyst to give a trimethoxysilyl group.

The reactive silyl group may occur terminally or internally, or terminally and internally, within the organic polymer molecular chain. In particular, when the reactive silyl group occurs at one or each molecular terminus, the effective network chain content in the organic polymer components in the finally formed cured products becomes high, so that highly stretchable high-strength rubbery cured products can favorably be obtained with ease, for instance.

The main chain skeletons of the reactive silyl group-containing organic polymer (A) and organic polymer (B) to be used in the practice of the invention are not particularly restricted but those oxyalkylene polymers, vinyl polymers, unsaturated hydrocarbon polymers, polyester polymers, polyurethanes and like organic polymers which are generally known can be used as the main chain skeletons.

The main chain skeleton of the organic polymer (A) to be used in the practice of the invention is preferably an oxyalkylene polymer since it occurs as a liquid at room temperature and has good low-temperature characteristics, a low viscosity and good compatibility.

When the main chain skeleton of the organic polymer (A) is an oxyalkylene polymer, the polymer main chain-constituting unit or units that can be used may be represented by the general formula (4):

$$-R^4-O- \qquad (4)$$

wherein $R^4$ is a divalent alkylene group containing 1 to 4 carbon atoms. From the ready availability viewpoint, oxypropylene polymers are more preferred.

The oxyalkylene polymer may be a straight one or branched one or a mixture thereof. It may further comprise another monomer unit, for instance. However, an oxyalkylene polymer in which the constituent unit or units represented by the above formula amount to 50% by weight or more, preferably 80% or more, of the polymer is preferred since such polymer is properly low in viscosity and enables the composition to give cured products having proper flexibility.

The molecular weight of the oxyalkylene polymer is not particularly restricted. However, the number average molecular weight as determined on the polystyrene equivalent basis by GPC analysis is preferably 500 to 100,000 and, from the ease of handling viewpoint, among others, it is preferably 1,000 to 70,000. A number average molecular weight of lower than 500 is unfavorable since it renders cured products fragile. At levels exceeding 100,000, the viscosity of the polymer unfavorably becomes excessively high.

Further, for this oxypropylene polymer, the ratio between weight average molecular weight and number average molecular weight, namely the ratio (Mw/Mn), is preferably not higher than 1.6, more preferably not higher than 1.5, still more preferably not higher than 1.4. While this molecular weight distribution can be determined by various methods, it is generally determined by gel permeation chromatography (GPC). When a reactive silyl group-containing oxypropylene polymer with an Mw/Mn of not higher than 1.6 is used, the resulting composition shows low viscosity and good workability.

The method of producing the polymer main chain in the oxyalkylene polymer is not particularly restricted but there may be mentioned, for example, the method comprising subjecting a monoepoxide to ring opening polymerization in the presence of an initiator and a catalyst. More specifically, there may be mentioned, for example, the polymerization method using an alkali catalyst such as KOH, the polymerization method using a transition metal compound-porphyrin complex catalyst, typically a complex obtained by reacting an organoaluminum compound with porphyrin as described, for example, in Japanese Kokai Publication Sho61-215623, the polymerization method using a compound metal cyanide complex catalyst described in Japanese Kokoku Publication Sho46-27250, Japanese Kokoku Publication Sho59-15336, U.S. Pat. No. 3,278,457, U.S. Pat. No. 3,278,458, U.S. Pat. No. 3,278,459, U.S. Pat. No. 3,427,256, U.S. Pat. No. 3,427,334 or U.S. Pat. No. 3,427,335, for instance, and the polymerization method using a phosphazene as described in, for example, Japanese Kokai Publication H11-60723. Among them, the polymerization method using a compound metal cyanide complex catalyst and the polymerization method using a phosphazene are preferred since they can give, without substantial discoloration, polyoxyalkylene polymers with a narrow molecular weight distribution even when their molecular weight is high and they are thus characterized in that they can give oxyalkylene polymers high in molecular weight but low in viscosity.

In addition, the polymer main chain of the oxyalkylene polymer can also be obtained by subjecting a hydroxyl group-terminated polyoxyalkylene polymer to chain extension using an alkyl halide having two or more functional value, for example $CH_2Cl_2$ or $CH_2Br_2$, in the presence of a basic compound, for example KOH, NaOH, $KOCH_3$ or $NaOCH_3$. Further, mention may also be made of the method of chain extension of a hydroxyl-terminated polyoxyalkylene polymer which uses a bifunctional or trifunctional isocyanate compound.

In addition to the above-mentioned oxyalkylene polymers, a reactive silyl group-containing vinyl polymer can also be used as the main chain skeleton of the organic polymer (A) to be used according to the invention. The main chain of the vinyl polymer can be obtained by controlled radical polymerization or free radical polymerization.

First, the case of controlled radical polymerization is described.

The present inventors have so far made a number of inventions concerning various vinyl polymers having diverse crosslinkable functional groups at a polymer terminus or termini, methods of production thereof, and curable compositions comprising the same and uses thereof (cf. e.g. Japanese Kokai Publication Hei11-080249, Japanese Kokai Publication Hei11-080250, Japanese Kokai Publication Hei11-005815, Japanese Kokai Publication Hei11-116617, Japanese Kokai Publication Hei11-116606, Japanese Kokai Publication Hei11-080571, Japanese Kokai Publication Hei11-080570, Japanese Kokai Publication Hei11-130931, Japanese Kokai Publication Hei11-100433, Japanese Kokai Publication Hei11-116763, Japanese Kokai Publication Hei09-272714, Japanese Kokai Publication Hei09-272715, and the like). The vinyl polymer is not particularly restricted but all the polymers invented and disclosed in the above-cited publications can suitably be used.

As a vinyl monomer which constitutes the main chain of the vinyl polymer is not particularly limited, and any of various monomers can be used. Examples of the vinyl monomer include (meth) acrylic acid monomers, such as (meth) acrylic acid, methyl (meth)acrylate, ethyl (meth)acrylate, n-propyl (meth)acrylate, isopropyl (meth)acrylate, n-butyl (meth)acrylate, isobutyl (meth)acrylate, tert-butyl (meth)acrylate, n-pentyl (meth)acrylate, n-hexyl (meth)acrylate, cyclohexyl (meth)acrylate, n-heptyl (meth)acrylate, n-octyl (meth)acrylate, 2-ethylhexyl (meth)acrylate, nonyl (meth)acrylate, decyl (meth)acrylate, dodecyl (meth)acrylate, phenyl (meth)acrylate, tolyl (meth)acrylate, benzyl (meth)acrylate, 2-methoxyethyl (meth)acrylate, 3-methoxybutyl (meth)acrylate, 2-hydroxyethyl (meth)acrylate, 2-hydroxypropyl (meth)acrylate, stearyl (meth)acrylate, glycidyl (meth)acrylate, 2-aminoethyl (meth)acrylate, γ-(methacryloyloxypropyl)trimethoxysilane, ethylene oxide adduct of (meth)acrylic acid, trifluoromethylmethyl (meth)acrylate, 2-trifluoromethylethyl (meth)acrylate, 2-perfluoroethylethyl (meth)acrylate, 2-perfluoroethyl-2-perfluorobutylethyl (meth)acrylate, 2-perfluoroethyl (meth)acrylate, perfluoromethyl (meth) acrylate, diperfluoromethylmethyl (meth)acrylate, 2-perfluoromethyl-2-perfluoroethylmethyl (meth)acrylate, 2-perfluorohexylethyl (meth)acrylate, 2-perfluorodecylethyl (meth) acrylate, and 2-perfluorohexadecylethyl (meth)acrylate; aromatic vinyl monomers, such as styrene, vinyltoluene, α-methylstyrene, chlorostyrene, and styrenesulfonic acid and its salts; fluorine-containing vinyl monomers, such as perfluoroethylene, perfluoropropylene, and vinylidene fluoride; silicon-containing vinyl monomers, such as vinyltrimethoxysilane and vinyltriethoxysilane; maleic anhydride, maleic acid, and monoalkyl esters and dialkyl esters of maleic acid; fumaric acid and monoalkyl and dialkyl esters of fumaric acid; maleimide monomers, such as, maleimide, methylmaleimide, ethylmaleimide, propylmaleimide, butylmaleimide, hexylmaleimide, octylmaleimide, dodecylmaleimide, stearylmaleimide, phenylmaleimide, and cyclohexylmaleimide; acrylonitrile monomers, such as acrylonitrile and methacrylonitrile; amido-containing vinyl monomers, such as acrylamide and methacrylamide; vinyl esters, such as vinyl acetate, vinyl propionate, vinyl pivalate, vinyl benzoate, and vinyl cinnamate; alkenes, such as ethylene and propylene; conjugated dienes, such as butadiene and isoprene; and vinyl chloride, vinylidene chloride, allyl chloride, and allyl alcohol. These compounds may be used alone, or at least two may be copolymerized.

The main chain of the vinyl polymer is preferably one produced by polymerizing predominantly at least one monomer selected from the group consisting of (meth)acrylic monomers, acrylonitrile monomers, aromatic vinyl monomers, fluorine-containing vinyl monomers and silicon-containing vinyl monomers. The term "predominantly" as used herein means that the above-mentioned monomer accounts for not less than 50 mole percent, preferably not less than 70 mole percent, of the monomer units constituting the vinyl polymer.

In particular, from the viewpoint of physical properties of a product, styrene monomers and (meth)acrylic monomers are preferred. Acrylate monomers and methacrylate monomers are more preferred, acrylate monomers are further preferred, and butyl acrylate is further more preferred. In the present invention, these preferred monomers may be copolymerized, e.g., block-copolymerized, with another monomer. In this case, the content by weight of the preferred monomers is preferably 40% by weight or more. In the above expression, the term "(meth)acrylic acid" means acrylic acid and/or methacrylic acid.

In those fields of application where rubber elasticity is required, the vinyl polymer preferably has a glass transition temperature of room temperature or lower than the expected use temperature range, although this is not critical.

The molecular weight distribution [ratio (Mw/Mn) of the weight average molecular weight (Mw) to the number average molecular weight (Mn) determined by gel permeation chromatography] of vinyl polymer is not particularly limited, but the ratio is preferably less than 1.8, more preferably 1.7 or less, still more preferably 1.6 or less, further preferably 1.5 or less, particularly preferably 1.4 or less, and most preferably 1.3 or less. In GPC measurement in the present invention, a number average molecular weight and the like may be generally determined in terms of polystyrene using chloroform as a mobile phase and a polystyrene gel column for measurement.

The number average molecular weight of the vinyl polymer is not particularly restricted, and preferably in a range of 500 to 1,000,000, more preferably 1,000 to 100,000, and still more preferably 5,000 to 50,000 with gel permeation chromatography.

The method of synthesizing the vinyl polymer is preferably a living radical polymerization technique among controlled radical polymerization techniques, and the atom transfer radical polymerization technique is more preferred among them.

The atom transfer radical polymerization uses, as the initiator, an organic halide, particularly an organic halide having a highly reactive carbon-halogen bond (e.g., a carbonyl compound having a halogen at an α-position, or a compound having a halogen at a benzyl position), or a halogenated sulfonyl compound. Next, vinyl polymers produced by free radical polymerization will be described.

The vinyl monomer is not particularly limited, and therefore various vinyl monomers may be used and all the monomers used in the above-mentioned controlled radical polymerization technique may be suitably used.

The main chain of the vinyl polymer is preferably one produced by polymerizing predominantly at least one monomer selected from the group consisting of (meth)acrylic monomers, acrylonitrile monomers, aromatic vinyl monomers, fluorine-containing vinyl monomers and silicon-containing vinyl monomers, but this is not limitative. The term "predominantly" as used herein means that the above-mentioned monomer accounts for not less than 50 mole percent, preferably not less than 70 mole percent, of the monomer units constituting the vinyl polymer.

In particular, from the viewpoint of physical properties of a product, styrene monomers and (meth)acrylic monomers are preferred. Acrylate monomers and methacrylate monomers are more preferred. In the present invention, these preferred monomers may be copolymerized, e.g., block-copolymerized, with another monomer. In this case, the content by weight of the preferred monomers is preferably 40% or more. In the above expression, the term "(meth)acrylic acid" means acrylic acid and/or methacrylic acid. These may be used singly or a plurality thereof may be subjected to copolymerization.

The vinyl polymer may contain, in addition to the above-mentioned (meth) acrylic ester and/or other monomer units, a further unit or units derived from a monomer or monomers copolymerizable with the above-mentioned monomers. For example, (meth)acrylic acid and like carboxyl group-containing monomers, (meth)acrylamide, N-methylol(meth)acrylamide and like amide group-containing monomers, glycidyl (meth)acrylate and like epoxy group-containing monomers, and diethylaminoethyl (meth)acrylate, aminoethyl vinyl ether and like amino group-containing monomers, for instance, are expected to produce copolymerization effects from the moisture curability and internal curability viewpoint. As other monomer units, there may further be mentioned monomer units derived from acrylonitrile, styrene, α-methylstyrene, alkyl vinyl ethers, vinyl chloride, vinyl acetate, vinyl propionate, ethylene, etc.

The number average molecular weight of the vinyl polymer in that case is not particularly restricted. From the ease of handling viewpoint, however, the vinyl polymers having a number average molecular weight of 500 to 100,000 as determined by gel permeation chromatography are preferred. Further, those having a number average molecular weight of 5,000 to 30,000 are more preferred in view of the good weather resistance of cured products and of its workability.

The method of synthesizing the vinyl polymer main chain by free radical polymerization may be an ordinary method of vinyl polymerization, for example the solution polymerization method involving a radical reaction. The polymerization is generally carried out by charging a reactor with the monomer (s) mentioned above and a radical initiator and a chain transfer agent, among others, and allowing the reaction to proceed at 50 to 150° C.

As examples of the radical initiator mentioned above, there may be mentioned azo type initiators such as 2,2'-azobisisobutyronitrile, 2,2'-azobis(2-methylbutyronitrile), 4,4'-azobis(4-cyanovaleric acid), 1,1'-azobis(1-cyclohexanecarbonitrile), azobisisobutyramidine hydrochloride and 2,2'-azobis(2,4-dimethylvaleronitrile), and organic peroxide initiators such as benzoyl peroxide and di-tert-butyl peroxide. Azo type initiators are preferably used, however, since they will not be influenced by solvents to be used in polymerization and the possibility of their creating such a danger as explosion is low.

Examples of the chain transfer agent are mercaptans such as n-dodecylmercaptan, tert-dodecylmercaptan, laurylmercaptan, γ-mercaptopropyltrimethoxysilane, γ-mercaptopropylmethyldimethoxysilane, γ-mercaptopropyltriethoxysilane and γ-mercaptopropylmethyldiethoxysilane, and halogen-containing compounds.

The polymerization may be carried out in a solvent. Preferred examples of the solvent are ethers, hydrocarbons, esters and like inert solvents.

Those reactive silyl groups represented by the general formula (1) given above can similarly be used as the reactive silyl group in the vinyl polymer.

The method of introducing the reactive silyl group into the vinyl polymer includes not only the above-mentioned methods I), II) and III) but also the method comprising copolymerizing a compound containing both a polymerizable unsaturated bond and a reactive silyl group with a (meth)acrylic ester monomer unit, for example. As the compound containing both a polymerizable unsaturated bond and a reactive silyl group, there may generally be mentioned monomers represented by the general formula (5):

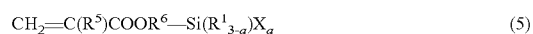

(wherein $R^5$ represents a hydrogen atom or a methyl group, $R^6$ represents a divalent alkylene group containing 1 to 6 carbon atoms and R', X and a are as defined above referring to the general formula (1)); or by the general formula (6):

(wherein $R^5$, $R^1$, X and a are as defined above), for example γ-methacryloxypropyltrimethoxysilane, γ-methacryloxypropylmethyldimethoxysilane, γ-methacryloxypropyltriethoxysilane and like γ-methacryloxypropylpolyalkoxysilanes; γ-acryloxypropyltrimethoxysilane, γ-acryloxypropylmethyldimethoxysilane, γ-acryloxypropyltriethoxysilane and like γ-acryloxypropylpolyalkoxysilanes; vinyltrimethoxysilane, vinylmethyldimethoxysilane, vinyltriethoxysilane and like vinylalkylpolyalkoxysilanes. As the polymer for introducing a reactive silyl group in which a is 3, there may be mentioned γ-methacryloxypropyltrimethoxysilane, γ-methacryloxypropyltriethoxysilane and like γ-methacryloxypropyltrialkoxysilanes; γ-acryloxypropyltrimethoxysilane, γ-acryloxypropyltriethoxysilane and like γ-acryloxypropyltrialkoxysilanes; vinyltrimethoxysilane, vinyltriethoxysilane and like vinylalkyltrialkoxysilanes and so forth.

Now, the case of the main chain skeleton of the organic polymer (A) being a saturated hydrocarbon polymer is described. The reactive silyl group-containing saturated hydrocarbon polymer is a polymer substantially free of any carbon-carbon unsaturated bond except for aromatic ring ones and includes, among others, polyethylene, polypropylene, polyisobutylene, hydrogenated polybutadiene and hydrogenated polyisoprene.

These reactive silyl group-containing saturated hydrocarbon polymers can be used singly or two or more of them can be used in combination.

The polymer constituting the skeleton of the reactive silyl group-containing saturated hydrocarbon polymer to be used in the practice of the invention can be obtained, for example, by (1) polymerizing an olefinic compound containing 1 to 6 carbon atoms, such as ethylene, propylene, 1-butene or isobutylene, as the main monomer or (2) polymerizing a diene compound such as butadiene or isoprene either singly or copolymerizing the same with such an olefinic compound as mentioned above and then hydrogenating the resulting (co) polymer. Isobutylene polymers and hydrogenated polybutadiene polymers are preferred, however, since they easily allow terminal functional group introduction thereinto, their molecular weight can be controlled with ease and the number of functional groups can be increased.

The isobutylene polymer may be the one in which all monomer units are formed from isobutylene units, or the one containing monomer units copolymerizable with isobutylene preferably in a proportion of not higher than 50% (% by weight; hereinafter the same shall apply), more preferably not higher than 30%, most preferably not higher than 10% based on the isobutylene polymer.

As such monomer components, there may be mentioned olefins containing 4 to 12 carbon atoms, vinyl ethers, aromatic vinyl compounds, vinylsilanes and allylsilanes, among others. As such copolymer constituents, there may specifically be mentioned, among others, 1-butene, 2-butene, 2-methyl-1-butene, 3-methyl-1-butene, pentene, 4-methyl-1-pentene, hexene, vinylcyclohexene, methyl vinyl ether, ethyl vinyl ether, isobutyl vinyl ether, styrene, α-methylstyrene, dimethylstyrene, monochlorostyrene, dichlorostyrene, β-pinene, indene, vinyltrichlorosilane, vinylmethyldichlorosilane, vinyldimethylchlorosilane, vinyldimethylmethoxysilane, vinyltrimethylsilane, divinyldichlorosilane, divinyldimethoxysilane, divinyldimethylsilane, 1,3-divinyl-1,1,3,3-tetramethyldisiloxane, trivinylmethylsilane, tetravinylsilane, allyltrichlorosilane, allylmethyldichlorosilane, allyldimethylchlorosilane, allyldimethylmethoxysilane, allyltrimethylsilane, diallyldichlorosilane, diallyldimethoxysilane, diallyldimethylsilane, γ-methacryloyloxypropyltrimethoxysilane and γ-methacryloyloxypropylmethyldimethoxysilane.

Further, when a vinylsilane or allylsilane is used as the monomer copolymerizable with isobutylene, the silicon content increases, the quantity of the group capable of serving as a silane coupling agent increases and the resulting primer composition is improved in adhesion properties.

In the hydrogenated polybutadiene polymer or other saturated hydrocarbon polymer, one or more other monomer unit species may be caused to be contained therein in addition to the main component monomer unit species, as in the case of the above-mentioned isobutylene polymer.

In the reactive silyl group-containing saturated hydrocarbon polymer to be used in the practice of the invention, such a monomer unit species as leaving a double bond after polymerization, for example butadiene, isoprene or a like polyene compound, may be caused to be contained in a small amount, preferably not larger than 10% by weight, more preferably not larger than 5% by weight, most preferably not larger than 1%, as long as the object of the present invention is accomplished.

The saturated hydrocarbon polymer, preferably an isobutylene polymer or hydrogenated polybutadiene polymer, preferably has a number average molecular weight of about 500 to 50,000 and, in particular, such one having a molecular weight of 1,000 to 20,000 and occurring as a liquid or having flowability is preferred from the ease of handling viewpoint, among others.

Now, the method of producing a reactive silyl group-containing saturated hydrocarbon polymer is described.

Among the reactive silyl group-containing isobutylene polymer species, the isobutylene polymer having a reactive silyl group at one or each molecular chain terminus can be produced by using an isobutylene polymer of the terminal function type, preferably of the all terminal function type, obtained by the so-called inifer polymerization method (cationic polymerization using a specific compound called inifer, which serves as an initiator and at the same time as a chain transfer agent). For example, mention may be made of the method comprising preparing an unsaturated group-terminated polyisobutylene species by dehydrohalogenation of this polymer or by unsaturated group introduction into the polymer by such a method as described in Japanese Kokai Publication Sho63-105005 and then introducing a reactive silyl group into the polymer by the addition of a hydrosilane compound using a platinum catalyst in the manner of the so-called hydrosilylation reaction, like in the case of the above-mentioned reactive silyl group-containing oxyalkylene polymer or vinyl polymer. As the hydrosilane compound, those compounds mentioned above can be suitably used.

Such production methods are described, for example, in the specifications of Japanese Kokoku Publication Hei04-69659, Japanese Kokoku Publication Hei07-108928, Japanese Patent No. 2512468, Japanese Kokai Publication Sho64-22904 and Japanese Patent No. 2539445.

An isobutylene polymer containing reactive silyl groups internally in the molecular chain can be produced by adding a reactive silyl group-containing vinylsilane or allylsilane to the isobutylene-based monomer composition and subjecting the whole composition to copolymerization.

Further, when, in carrying out the polymerization for producing an isobutylene polymer having a reactive silyl group at one or each molecular chain terminus, a reactive silyl group-containing vinylsilane, allylsilane or the like, in addition to the main component isobutylene monomer, to copolymerization and then a terminal reactive silyl group is introduced into the resulting polymer, an isobutylene polymer having reactive silyl groups terminally and internally in the molecular chain is produced.

As for the hydrogenated polybutadiene polymer mentioned above, the hydroxyl group of a hydroxyl-terminated hydrogenated polybutadiene species is first converted to an oxymetal group such as —ONa or —OK and then the resulting species is reacted with an organohalogen compound represented by the general formula (2) or (3), whereby an olefinic group-terminated, hydrogenated polybutadiene polymer (hereinafter also referred to as "olefin-terminated hydrogenated polybutadiene polymer") is produced.

As the method of converting the terminal hydroxyl group of a hydroxyl-terminated hydrogenated polybutadiene polymer to an oxymetal group, there may be mentioned the method involving the reaction with an alkali metal such as Na or K; a metal hydride such as NaH; a metal alkoxide such as $NaOCH_3$; or an alkali hydroxide such as NaOH or KOH, for instance.

The method mention above gives an olefin-terminated hydrogenated polybutadiene polymer having almost the same molecular weight as the hydroxyl-terminated hydrogenated polybutadiene polymer used as the starting material. In cases where a polymer with a higher molecular weight is desired, the molecular weight can be increased by reacting the intermediate polymer with a polyvalent organohalogen compound containing two or more halogen atoms in each molecule, such as methylene chloride, bis(chloromethyl)benzene or bis(chloromethyl)ether prior to the reaction with an organohalogen compound of general formula (2) or (3) and, thereafter, the resulting polymer is reacted with an organohalogen compound represented by the general formula (2) or (3), whereby an olefinic group-terminated hydrogenated polybutadiene polymer with an increased molecular weight can be obtained.

The introduction of a reactive silyl group into the olefin-terminated hydrogenated polybutadiene polymer mentioned above is realized by the addition reaction of a hydrosilane compound using a platinum-based catalyst in the same manner as in the case of the isobutylene polymer having a reactive silyl group at one or each molecular chain terminus.

When the reactive silyl group-containing saturated hydrocarbon polymer contains substantially no non-aromatic ring unsaturated bond within the molecule, as mentioned above, the coat films formed therefrom are superior in weather resistance to the coat films formed from the conventional rubber-like polymer such as an unsaturated bond-containing organic polymer or an oxyalkylene polymer. Further, since said polymer is a hydrocarbon polymer, it has good moisture barrier properties, good water resistance and is capable of excellently bonding to various inorganic substrates such as glass and aluminum, and it forms coat films having good moisture barrier properties.

When the main chain skeleton of the component (A) is an oxyalkylene polymer, the curable composition of the invention and cured products comprising the same can be provided with good low-temperature characteristics, flexibility and good compatibility with the other component(s), among others.

Further, when the main chain skeleton of the component (A) is a vinyl polymer, in particular a (meth) acrylic polymer, the curable composition of the invention and cured products comprising the same can be provided with good weather resistance, flexibility and good compatibility with the other component(s), among others, by adjusting the monomer species.

The main chain skeleton of such components (A) may be a simple one and, when two or more species are combined, a curable composition and cured products comprising the same, which have the above-mentioned characteristic features in combination, can be obtained. For example, when an oxyalkylene polymer and a (meth)acrylic polymer are used in combination, the good weather resistance of the (meth) acrylic polymer can be provided in addition to the good low-temperature characteristics, flexibility and compatibility with the other component(s) of the oxyalkylene polymer, among others.

In the practice of the invention, the organic polymer (B) containing, on an average, 0.5 to 1.5 reactive silyl groups represented by the general formula (1) shown below in each molecule improves the otherwise fragile mechanical physical properties of the cured product as resulting from the single use of the organic polymer (A) by forming a crosslinked structure with the reactive silyl group(s) in the above-mentioned organic polymer (A). By using an organic polymer (B) low in molecular weight, it is also possible for that polymer (B) to function as a reactive plasticizer or diluent and thereby reduce the viscosity of the composition.

$$-Si(R^1{}_{3-a})X_a \quad (1)$$

(In the above formula, $R^1$ represents an alkyl group containing 1 to 20 carbon atoms, an aryl group containing 6 to 20 carbon atoms, an aralkyl group containing 7 to 20 carbon atoms or a triorganosiloxy group represented by $(R')_3SiO—$ (in which the three R' groups may be the same or different and each represents a monovalent hydrocarbon group containing 1 to 20 carbon atoms) and, when there are two or more $R^1$ groups, they may be the same or different, and X represents a hydroxyl group or a hydrolysable group and, when there are two or more X groups, they may be the same or different, and a represents 1, 2 or 3.)

The reactive silyl group in the reactive silyl group-containing organic polymer (B) is not particularly restricted but any of the same ones as the reactive silyl groups in the organic polymer (A) containing one or more reactive silyl groups represented by the general formula (1) can be used without any problem. Alkoxysilyl groups are preferred in view of their highly susceptible hydrolysis and their mild hydrolyzability and ease of handling; specifically, the group in question is preferably at least one species selected from the group consisting of dimethylmonomethoxysilyl, methyldimethoxysilyl, trimethoxysilyl, methyldiethoxysilyl, ethyldiethoxysilyl, triethoxysilyl, methyldiisopropenyloxysilyl and triisopropenyloxysilyl.

When a=2 in the general formula (1), the effect of improving the fragile feature of cured products formed from the organic polymer (A) alone; namely, the modulus of cured products can be properly lowered and good stretchability can be secured and, further, good storage stability can favorably be secured. Specifically, there may be mentioned at least one species selected from the group consisting of methyldimethoxysilyl, methyldiethoxysilyl, ethyldiethoxysilyl, methyldiisopropenyloxysilyl, and methyldimethoxysilyl is preferred among others because of its high susceptibility to hydrolysis.

When a=3 in the general formula (1), a reduction in viscosity and improvements in mechanical physical properties balance can be favorably attained while the rapid curability intrinsic in the organic polymer (A) is retained. Specifically, there may be mentioned at least one species selected from the group consisting of trimethoxysilyl, triethoxysilyl and triisopropenyloxysilyl, and methyldimethoxysilyl is preferred among others because of its high susceptibility to hydrolysis.

The main chain skeleton of the reactive silyl group-containing organic polymer (B) of the present invention is not particularly restricted but, for example, any of those oxyalkylene polymers, vinyl polymers, saturated hydrocarbon polymers, polyester polymers, polyurethanes and like organic polymers which are generally known can be used as the main chain skeleton. Specifically, those given hereinabove as examples referring to the organic polymer (A) can be suitably used.

In addition, organic polymers (B) prepared by introducing a reactive silyl group(s) into unsaturated group-containing low-molecular polymers derived from 1-butene, 1-hexene, 1-octene, 1-decene, 1-dodecene, 1-tetradecene, 1-hexadecene, 1-octadecene, other α-olefin compounds containing not less than 20 carbon atoms, 1,5-hexadiene, 1,9-decadiene, 1,17-octadecadiene and/or the like can also be suitably used. When such organic polymers (B) produced by reactive silyl group introduction into such low-molecular polymers, in particular into polymers derived from a saturated hydrocarbon(s) containing not more than 20 carbon atoms, are used, the compatibility is good and the viscosity of the organic polymer (A) can be reduced by their use in small quantities.

Preferred among others from the raw material availability and reactivity viewpoint are those having an unsaturated group at one terminus, such as 1-butene, 1-hexene, 1-octene, 1-decene, 1-dodecene, 1-tetradecene, 1-hexadecene and 1-octadecene.

Oxyalkylene polymers are preferred among others since they are liquid at room temperature, good in low temperature characteristics, low in viscosity and still good in compatibility.

As for the method of reactive silyl group introduction into the organic polymer (B), the same methods I), II) and III) as the methods of introduction into the organic polymer (A) mentioned above can be applied and, for example, the introduction can be attained by reacting a reactive silyl group-containing compound containing a reactive silyl group represented by the general formula (1) and a functional group capable of reacting with a reactive group in the organic polymer with the organic polymer in an amount of not smaller than 0.5 mole but not larger than 1.5 moles per mole of the polymer.

More specifically, the method I) may be the method comprising reacting 0.5 to 1.5 equivalents of a hydrosilane compound with an organic polymer having an allyl group at each terminus, and the method II) may be the method comprising reacting 0.5 to 1.5 equivalents of an isocyanatosilane compound with an organic polymer having a hydroxyl group at each terminus. However, like the method of introduction into the above-mentioned organic polymer (A), the method I) is preferred from the residual material removability and reactivity viewpoint. The method I) is preferred also because such a structure as possibly causing a reduction in thermal stability, for example a urethane bond or urea bond, will not be formed.

When the rate of reactive silyl group introduction into the organic polymer (B) is lower than 0.5 mole per molecule, the reactivity with the organic polymer (A) is insufficient and the cured products cannot have good physical properties. When it is higher than 1.5 moles and when the polymer is mixed with the organic polymer (A), the cured products will have fragile physical properties. The reactive silyl group introduction rate is preferably not higher than 1.4, more preferably not higher than 1.2.

From the probability viewpoint, the above-mentioned methods of reactive silyl group introduction results in the simultaneous formation of products resulting from introduction of a plurality of reactive silyl groups, one group or no group, on the average, per molecule. The products resulting from introduction of a plurality, on average, of reactive silyl groups per polymer molecule are less effective in improving the fragility of the cured products according to the invention but maintain or improve the modulus, among mechanical physical properties, of the cured products derived from the organic polymer (A) alone. The molecules resulting from introduction of one or no reactive silyl group can provide the cured products of the invention with flexibility and lowers the modulus, among mechanical physical properties, of the cured products derived from the organic polymer (A) alone. However, the molecules having no reactive silyl group introduced at all have no reactivity and may possibly flow out of the cured products obtained by using the curable composition of the invention, causing such problems as bleeding and coat film staining in the field of application as sealing materials or adhesives.

Therefore, the organic polymer (B) preferably has substantially one reactive silyl group represented by the general formula (1) and thus is preferably obtained by reacting one reactive silyl group-containing compound molecule represented by the general formula (1) selectively with one reactive group in the precursor polymer. As for the method of production thereof, the above-mentioned precursor polymer having only one reactive group capable of reacting with the reactive silyl group-containing compound is used in the above-mentioned reactive silyl group introduction method I), II) or III), for instance, whereby an organic polymer (B) having one reactive silyl group can selectively be obtained.

As for the polymerization to give the above-mentioned precursor polymer having only one reactive group, an oxyalkylene polymer is produced using, as the initiator, a monovalent primary, secondary or tertiary alcohol such as methanol, ethanol, propanol, butanol, pentanol, hexanol, heptanol, octanol, nonanol or decanol or a monovalent unsaturated group-containing alcohol such as allyl alcohol, methallyl alcohol or propenyl alcohol to give a polymer having a hydroxyl group only at one terminus, the hydroxyl group of which polymer may be converted to an unsaturated group in the above-mentioned manner, or a polymer is produced by atom transfer radical polymerization using a monovalent organic halide or the like as the initiator and a transition metal complex as a catalyst and the terminus thereof is converted to a hydroxyl group or unsaturated group, for instance.

Even in the case of a precursor polymer having an unsaturated group and a hydroxyl group at respective separate termini, reactive silyl group introduction can be realized by using, for example an isocyanatosilane, which is capable of reacting with the hydroxyl group, or a hydrosilane compound capable of being almost quantitatively introduced into the unsaturated group although it reacts also with the hydroxyl group to a slight extent.

In addition, 1-butene, 1-hexene, 1-octene, 1-decene, 1-dodecene, 1-tetradecene, 1-hexadecene, 1-octadecene and α-olefin compounds containing 20 or more carbon atoms can also be suitably used in producing polymers having an unsaturated group at one terminus.

The molecular weight of the component (B) is not particularly restricted but is preferably not higher than 8,000, more preferably not higher than 5,000 in view of the workability after admixing with the component (A), among others. When the molecular weight is above 8,000, the effect of reducing the viscosity of the organic polymer (A) becomes low.

Further, when the molecular weight of the organic polymer (B) is smaller by at least 1,000, preferably at least 3,000, than the molecular weight of the organic polymer (A), the viscosity reducing effect is high.

In the practice of the invention, the usage of the reactive silyl group-containing organic polymer (B) is not particularly restricted but the polymer is preferably used in an amount within the range of 0.1 part by weight to 200 parts by weight, more preferably within the range of 1 part by weight to 100 parts by weight, per 100 parts by weight of the reactive silyl group-containing organic polymer (A). When the use amount is less than 0.1 part by weight, the effects of the invention may not be obtained and, when it is greater than 200 parts by weight, the good recovery, durability and creep resistance intrinsic in the organic polymer (A) may be deteriorated in some instances.

Since the organic polymer (B) is reactive with an organic polymer and thus can form a crosslinked structure, the use of the low-molecular organic polymer (B) can be expected to be effective in alleviating the plasticizer staining of the sealing materials as compared with the conventional use of a plasticizer in large amounts. Further, the effect of reducing tack on the cured product surface to make it difficult for dust and dirt to stick to the surface can also be expected.

In the practice of the invention, a vinyl polymer (C) having a reactive silyl group capable of reacting with the reactive silyl groups in the organic polymer (A) and organic polymer (B) can be additionally used and the combined use thereof makes it possible to further provide good weather resistance, tackiness and adhesion properties.

Suitably usable as the reactive silyl group in the vinyl polymer (C) are the above-mentioned ones represented by the general formula (1) and, more specifically, those enumerated hereinabove referring to the organic polymer (A) and organic polymer (B) can be used likewise.

As for the method of polymerization for the formation of the main chain skeleton of the vinyl polymer (C), the above-mentioned vinyl polymer production methods, for example controlled radical polymerization and free radical polymerization, can be applied likewise.

From the ease of handling viewpoint, the vinyl polymer (C) preferably has a number average molecular weight of 500 to 100,000, more preferably 1,000 to 30,000, still more preferably 2,000 to 20,000. Within the latter two ranges, the physical properties under extension of the cured products are improved and, further, the weather resistance and workability are good. The number average molecular weight of the vinyl polymer (C) is determined by GPC as a polystyrene equivalent molecular weight.

The number of reactive silyl groups per molecule of the vinyl polymer (C) is preferably 1.1 to 5.

The level of addition of the vinyl polymer (C) is not particularly restricted but the amount of (C) is preferably within the range of 0.1 part by weight to 200 parts by weight, more preferably within the range of 1 part by weight to 100 parts by weight, per 100 parts of the reactive silyl group-containing organic polymer (A)+(B). When the amount is smaller than 0.1 part by weight, the weather resistance, tackiness and adhesion property improving effects of (C) cannot be obtained in some cases and, when it is larger than 200 parts by weight, the workability and dust adhesion resistance may be impaired in certain cases.

The composition of the invention can contain one or more of various curing catalysts, fillers and additives known in the art. If necessary, it can further contain a plasticizer or the like.

Wide range of conventionally known curing catalysts can be used. As specific examples of the curing catalyst, silanol condensation catalysts including titanium compounds such as tetrabutyl titanate, tetrapropyl titanate, tetraacetylacetonate titanium, etc.; tetravalent tin compounds such as dibutyltin dilaurate, dibutyltin maleate, dibutyltin phthalate, dibutyltin dioctanoate, dibutyltin di(ethyl hexanoate), dibutyltin di(methyl maleate), dibutyltin di(ethyl maleate), dibutyltin di(butyl maleate), dibutyltin di(octyl maleate), dibutyltin di(tridecyl maleate), dibutyltin di(benzyl maleate), dibutyltin diacetate, dioctyltin di(ethyl maleate), dioctyltin di(octyl maleate), dibutyltin dimethoxide, dibutyltin di(nonyl phenoxide), dibutenyltin oxide, dibutyltin di(acetyl acetonate), dibutyltin di(ethyl acetoacetonate), reaction products of dibutyltin oxide with phthalic esters, etc.; divalent tin compounds such as stannous octanoate, tin naphthenate, stannous stearate, stannous versatate, etc.; organoaluminum compounds such as aluminum tris(acetylacetonate), aluminum tris(ethyl acetoacetate), diisopropoxyaluminum-ethyl acetoacetate, etc.; zirconium compounds such as zirconium tetraacetylacetonate etc.; lead octanoate; amine compounds such as butylamine, octylamine, dibutylamine, monoethanolamine, diethanolamine, triethanolamine, diethylenetriamine, triethylenetetramine, oleylamine, cyclohexylamine, benzylamine, diethylaminopropylamine, xylylenediamine, triethylenediamine, guanidine, diphenylguanidine, 2,4,6-tris(dimethylaminomethyl)phenol, morpholine, N-methylmorpholine, 2-ethyl-4-methylimidazole, 1,8-diazabicyclo(5.4.0)undecene-7 (DBU), etc. or salts of these amine compounds with carboxylic acids etc.; low molecular weight polyamide resins obtainable from an excess of a polyamine with polybasic acids; reaction products of an excess of a polyamine with epoxy compounds; silane coupling agents having an amino group such as γ-aminopropyltrimethoxysilane, N-(β-aminoethyl)aminopropylmethyldimethoxysilane, etc.; other known silanol condensation catalysts such as other acid catalysts and basic catalysts, among others, can be mentioned. These catalysts may be used each independently or in a combination of two or more species.

The amount of use of such a curing catalyst relative to a combined total of 100 parts by weight of the reactive silyl group-containing organic polymer (A) and reactive silyl group-containing organic polymer (B) is preferably about 0.1 to 20 parts by weight. Too low amount of use of the curing catalyst is not preferable, because the curing speed is decreased and the curing reaction does not proceed sufficiently. On the other hand, too high amount of use of the curing catalyst is not preferable, because local exothermic reaction and foaming take place in curing and a good cured product cannot be easily obtained.

For the purpose of enhancing the activity of the condensation catalyst, the curable composition of the invention may be supplemented with a silicon compound which may be represented by the general formula: $R^1_{4-a}Si(OR^1)_a$ (wherein the $R^1$ groups and a represent the same as the above). This silicon compound is not restricted but the compounds of the above general formula wherein at least one of $R^2$ directly bonded to Si atom is an aryl group of 6 to 20 carbon atoms, such as phenyltrimethoxysilane, phenylmethyldimethoxysilane, phenyldimethylmethoxysilane, diphenyldimethoxysilane, diphenyldiethoxysilane, and triphenylmethoxysilane, are preferred because these are especially effective in accelerating the curing reaction of the composition. In consideration of cost and availability, diphenyldimethoxysilane and diphenyldiethoxysilane are particularly preferred. The formulating amount of this silicon compound is preferably about 0.01 to 20 parts by weight, more preferably 0.1 to 10 parts by weight, based on a combined total of 100 parts by weight of the reactive silyl group-containing organic polymer (A) and reactive silyl group-containing organic polymer (B). If the formulating amount of the silicon compound is below the above range, the accelerating effect on the curing reaction tends to be insufficient. On the other hand, if the formulating amount of the silicon compound exceeds the above range, the hardness and tensile strength of the cured product tend to be decreased.

The composition of the invention may be supplemented with a silane coupling agent, a reaction product of a silane coupling agent, or a compound other than a silane coupling agent as an adhesion-imparting agent. Specifically, the silane coupling agent includes isocyanato group-containing silanes such as γ-isocyanatopropyltrimethoxysilane, γ-isocyanatopropyltriethoxysilane, γ-isocyanatopropylmethyldiethoxysilane, γ-isocyanatopropylmethyldimethoxysilane, etc.; amino group-containing silanes such as γ-aminopropyltrimethoxysilane, γ-aminopropyltriethoxysilane, γ-aminopropylmethyldimethoxysilane, γ-aminopropylmethyldiethoxysilane, γ-(2-aminoethyl)aminopropyltrimethoxysilane, γ-(2-aminoethyl)aminopropylmethyldimethoxysilane, γ-(2-aminoethyl)aminopropyltriethoxysilane, γ-(2-aminoethyl)aminopropylmethyldiethoxysilane, γ-ureidopropyltrimethoxysilane, N-phenyl-γ-aminopropyltrimethoxysilane, N-benzyl-γ-aminopropyltrimethoxysilane, N-vinylbenzyl-γ-aminopropyltriethoxysilane, etc.; mercapto group-containing silanes such as γ-mercaptopropyltrimethoxysilane, γ-mercaptopropyltriethoxysilane, γ-mercaptopropylmethyldimethoxysilane, γ-mercaptopropylmethyldiethoxysilane, etc.; epoxy group-containing silanes such as γ-glycidoxypropyltrimethoxysilane, γ-glycidoxypropyltriethoxysilane, γ-glycidoxypropylmethyldimethoxysilane, β-(3,4-epoxycyclohexyl)ethyltrimethoxysilane, β-(3,4-epoxycyclohexyl)ethyltriethoxysilane, etc.; carboxysilanes such as β-carboxyethyltriethoxysilane, β-carboxyethylphenylbis(2-methoxyethoxy)silane, N-β-(carboxymethyl)aminoethyl-γ-aminopropyltrimethoxysilane, etc.; vinyl type unsaturated group-containing silanes such as vinyltrimethoxysilane, vinyltriethoxysilane, γ-methacryloyloxypropylmethyldimethoxysilane, γ-acryloyloxypropylmethyltriethoxysilane, etc.; halogen-containing silanes such as γ-chloropropyltrimethoxysilane etc.; and isocyanurate silanes such as tris(trimethoxysilyl)isocyanurate and so forth. Furthermore, the modification derivatives of these silanes, such as amino-modified silyl polymers, silylated amino group-containing polymers, unsaturated aminosilane complexes, phenylamino (long-chain) alkylsilanes, aminosilylated silicones, silylated polyesters, etc. may also be used likewise as silane coupling agents. In the present invention, the silane coupling agent is used generally within the range of 0.1 to 20 parts by weight, particularly preferably 0.5 to 10 parts by weight, based on a combined total of 100 parts by weight of the reactive silyl group-containing organic polymer (A) and reactive silyl group-containing organic polymer (B).

Regarding the effect of the silane coupling agent added to the curable composition of the invention, when the composition is applied to various adherends, namely inorganic substrates such as glass, aluminum, stainless steel, zinc, copper, mortar, etc. or organic substrates such as poly(vinyl chloride), acrylic resins, polyesters, polyethylene, polypropylene, polycarbonates, etc., the silane coupling agent produces marked improvements in adhesion whether under non-primer conditions or under primer conditions. The adhesion-improving effect on various adherends is particularly pronounced when it is used under non-primer conditions. As specific examples of the adhesion-imparting agent other than silane coupling agents, there can be mentioned but not particularly limited to epoxy resins, phenol resins, sulfur, alkyl titanates, and aromatic polyisocyanates, among others. These adhesion-imparting agents may be used each independently or as a mixture of two or more different species. By adding such an adhesive-imparting agent, the adhesion to various adherends can be improved.

The composition of the invention may be supplemented with various fillers. Among such fillers are reinforcing fillers such as fumed silica, precipitated silica, crystalline silica, fused silica, dolomite, silicic anhydride, hydrous silicic acid, and carbon black; such fillers as heavy calcium carbonate, calcium carbonate colloid, magnesium carbonate, diatomaceous earth, calcined clay, clay, talc, titanium dioxide, bentonite, organic bentonite, ferric oxide, aluminum dust, flint powder, zinc oxide, activated zinc white, Shirasu-balloons, glass microballoons, organic microballoons such as phenol resin and vinylidene chloride resin microballoons, and resin powders such as PVC powder and PMMA powder; fibrous fillers such as asbestos, glass fibers and filaments, and so forth. Such a filler or fillers are used within the range of 1 to 300 parts by weight, preferably 10 to 200 parts by weight, based on a combined total of 100 parts by weight of reactive silyl group-containing organic polymer (A) and reactive silyl group-containing organic polymer (B).

When it is desired to obtain a cured product of high hardness by using such a filler, it is advantageous to use a filler selected chiefly from fumed silica, precipitated silica, crystalline silica, fused silica, dolomite, silicic anhydride, hydrous silicic acid, carbon black, surface-treated microfine calcium carbonate, calcined clay, clay, activated zinc white, among others, and satisfactory results are obtained when such a filler or fillers are used in a proportion of 1 to 200 parts by weight relative to a combined total of 100 parts by weight of said reactive silyl group-containing organic polymer (A) and reactive silyl group-containing organic polymer (B). Furthermore, when it is desired to obtain a cured product with low strength and high elongation at break, it is advantageous to use a filler or fillers selected chiefly from titanium dioxide, calcium carbonate, magnesium carbonate, talc, ferric oxide, zinc oxide, silas balloons, among others, in a proportion of 5 to 200 parts by weight based on a combined total of 100 parts by weight of said reactive silyl group-containing organic polymer (A) and reactive silyl group-containing organic polymer (B). In this connection, calcium carbonate is generally characterized in that the larger its surface area, the greater is the degree of improvement in the strength at break, elongation at break, and adhesion of the cured product. Of course, these fillers may be used each independently or as a mixture of two or more different species. A fatty acid-surface treated calcium carbonate colloid and a calcium carbonate having a particle diameter of 1 μm or more, such as non surface-treated heavy calcium carbonate may be used combinedly.

For the purpose of improving the workability (knife-releasability and other properties) of the composition and giving a matte effect on the surface of the cured product, addition of organic balloons or inorganic balloons is preferred. These fillers may be surface-treated and can be used each species independently or as a mixture of two or more different species. For improving the workability (knife-releasability and other properties), the particle size of balloons is preferably not more than 0.1 mm. For imparting a matte effect to the surface of the cured product, the preferred size is 5 to 300 μm.

The composition of the invention can be applied with advantage to the joints of exterior walls of houses, such as siding boards, particularly ceramic siding boards but it is preferable to match the sealing material design to the siding design. As exterior walls, in particular, those with a deluxe feeling created by spatter coating or incorporation of colored aggregates are used these days. When a scaly or particulate substance not less smaller 0.1 mm, preferably about 0.1 to 5.0 mm, in diameter is formulated into the composition of the invention, the cured product matches up well with such deluxe-finished exterior walls and, in addition, shows good weather resistance. Thus, the composition is enabled to give a cured product capable of retaining the attractive appearance over years. When a particulate substance is formulated, a pebbled or sandstone-like coarse surface texture can be expressed. When a scaly substance is formulated, an irregular surface resulting from its scaly shape can be expressed.

When the composition of the invention contains particles of cured sealing material, the cured product is formed with surface irregularities, thus improved in the decorative effect. The preferred diameter, formulating amount, constituent material, etc. of said particles of cured sealing material are as described in Japanese Kokai Publication 2001-115142, as follows. The preferred diameter is 0.1 to 1 mm, more preferably about 0.2 to 0.5 mm. The formulating amount is preferably 5 to 100 weight %, more preferably 20 to 50 weight %, in the curable composition. The constituent material is not particularly restricted provided that it can be used as a sealing material and includes urethane resins, silicones, modified silicones, polysulfide rubber, etc., although a modified silicone type sealing material is preferred.

The composition of the invention may be supplemented with a plasticizer component according to need, but this is not necessarily essential. The plasticizer mentioned just above is not particularly restricted but, depending on purposes, the following substances can be used each independently or as a mixture of two or more species: namely phthalic esters such as dibutyl phthalate, diheptyl phthalate, di(2-ethylhexyl)phthalate, butyl benzyl phthalate, etc.; non-aromatic dibasic acid esters such as dioctyl adipate, dioctyl sebacate, dibutyl sebacate, isodecyl succinate, etc.; fatty acid esters such as butyl oleate, methyl acetylricilynoleate, etc.; phosphoric esters such as tricresyl phosphate, tributyl phosphate, etc.; trimellitic esters; chlorinated paraffins; hydrocarbon oils such as alkyldiphenyls, partially hydrogenated terphenyl, etc.; process oils; epoxy plasticizers such as epoxidized soybean oil, benzyl epoxystearate, etc.; polyester plasticizers, etc.; plasticizers containing an acrylic component, for example a polymer derived from an acrylic monomer such as acrylic ester or acrylamide; and polyether polymers such as polyoxypropylene glycol, polyoxypropylene triols, and terminally alkyletherified derivatives thereof.

Among these, polymers derived from an acrylic monomer and polyether polymers are preferred. The polymers derived from an acrylic monomer and polyether polymers which are to be used have a molecular weight of not lower than 3,000, preferably not lower than 5,000, more preferably not lower than 10,000. It is also possible to incorporate these plasticizers in the step of polymer production.

In the curable composition of the invention, there may be incorporated a physical property modifier capable of adjusting the tensile properties of the resulting cured products, according to need. The physical property modifiers are not particularly restricted but include, for example, alkylakoxysilanes such as methyltrimethoxysilane, dimethyldimethoxysilane, trimethylmethoxysilane and n-propyltrimethoxysilane; alkylisopropenoxysilanes such as dimethyldiisopropenoxysilane, methyltriisopropenoxysilane, γ-glycidoxypropylmethyldiisopropenoxysilane, functional group-containing alkoxysilanes such as γ-glycidoxypropylmethyldimethoxysilane, γ-glycidoxypropyltrimethoxysilane, vinyltrimethoxysilane, vinyldimethylmethoxysilane, γ-aminopropyltrimethoxysilane, N-(β-aminoethyl)aminopropylmethyldimethoxysilane, γ-mercaptopropyltrimethoxysilane and γ-mercaptopropylmethyldimethoxysilane; silicone varnishes; polysiloxanes; and the like. By using such as a physical property modifier, it is possible to increase the hardness of the cured products after curing of the curable composition of the invention or decrease such hardness and attain extension at break. Such physical property modifiers as mentioned above may be used singly or two or more of them may be used in combination.

The physical property modifiers can be used in an amount within the range of 0.1 to 20 parts by weight, preferably 0.5 to 10 parts by weight, based on a combined total weight of 100 parts by weight of the reactive silyl group-containing organic polymer (A) and reactive silyl group-containing organic polymer (B).

If necessary, a thixotropic agent (antisagging agent) may be added to the curable composition of the invention to prevent sagging and improve the workability. The antisagging agents are not particularly restricted but include, for example, polyamide waxes, hydrogenated castor oil derivatives; metal soaps such as calcium stearate, aluminum stearate and barium stearate, and the like. These thixotropic agents (antisagging agent) may be used singly or two or more of them may be used in combination. The thixotropic agent can be used in an amount within the range of 0.1 to 20 parts by weight based on a combined total weight of 100 parts by weight of the reactive silyl group-containing organic polymer (A) and reactive silyl group-containing organic polymer (B).

In the composition of the invention, a compound containing one or more epoxy group(s) in each molecule can be used. The use of such epoxy group-containing compound can increase the recovery of the cured products. As examples of the epoxy group-containing compound, there may be mentioned, among others, epoxidized unsaturated fats and oils, epoxidized unsaturated fatty acid esters, alicyclic epoxy compounds, compounds to be shown as epichlorohydrin derivatives, and mixtures of these. More specifically, there may be mentioned epoxidized soybean oil, epoxidized linseed oil, di(2-ethylhexyl) 4,5-epoxycyclohexane-1,2-dicarboxylate (E-PS), octyl epoxystearate and butyl epoxystearate, etc. Among these, E-PS is particularly preferred. For the purpose of increasing the recovery of the cured products, a compound having one epoxy group within the molecule is preferably used. The epoxy compound is recommendably used in an amount within the range of 0.5 to 50 parts by weight per 100 parts of the sum of the reactive silyl group-containing organic polymer (A) and reactive silyl group-containing organic polymer (B).

In the composition of the invention, there may be used a photocurable substance. When a photocurable substance is used, the photocurable substance forms a coat film on the cured product surface and, thus, the cured products can be improved in stickiness and weather resistance. The photocurable substance, when exposed to the action of light, undergoes chemical changes in its molecular structure in a fairly short time, causing changes in physical properties, for example curing. A number of compounds of this kind are known, including organic monomers, oligomers, resins, and compositions comprising these, and any arbitrary one from among the commercial ones can be employed. Typically, an unsaturated acrylic compound, polyvinyl cinnamate, or an azidated resin, among others, can be used. Examples of the unsaturated acrylic compound are monomers containing one to several acrylic or methacrylic unsaturated groups, oligomers thereof, or mixtures thereof, propylene (or butylene or ethylene) glycol di(meth)acrylate, neopentyl glycol di(meth) acrylate and like monomers, and oligoesters having a molecular weight of not higher than 10,000. As more specific examples, there may be mentioned such special acrylates (difunctional) as ARONIX M-210, ARONIX M-215, ARONIX M-220, ARONIX M-233, ARONIX M-240 and ARONIX M-245; such trifunctional ones as ARONIX M-305, ARONIX M-309, ARONIX M-310, ARONIX M-315, ARONIX M-320 and ARONIX M-325; and such polyfunctional ones as ARONIX M-400. Acrylic functional group-containing compounds are particularly preferred, and compounds containing, on an average, three or more functional groups of the same kind in each molecule are also preferred. (All the above-mentioned ARONIX species are products of Toagosei Co., Ltd.)

The vinyl cinnamate polymers are photosensitive resins whose cinnamoyl groups function as photosensitive groups and include cinnamic acid-esterified polyvinyl alcohol species and various other polyvinyl cinnamate derivatives. The azidated resins are known as photosensitive resins with the azido group serving as a photosensitive group and generally include photosensitive rubber solutions with a diazide compound added as a photosensitive substance and, further, detailed examples are found in "Kankosei Jushi (Photosensitive Resins)" (published Mar. 17, 1972 by Insatsu Gakkai Shuppanbu, pages 93 ff, 106 ff, 117 ff). These can be used either singly or in admixture, with a sensitizer added, if necessary. The addition of a sensitizer such as a ketone or nitro compound or a promoter such as an amine can enhance the effects in some instances.

The level of addition of the photocurable substance is preferably 0.01 to 20 parts by weight, more preferably within the range of 0.5 to 10 parts by weight, per 100 parts by weight of the sum of the reactive silyl group-containing organic polymer (A) and reactive silyl group-containing organic polymer (B). At levels below 0.01 part by weight, the weather resistance increasing effect is slight and, at levels exceeding 20 parts by weight, the cured products become too hard, unfavorably allowing crack formation.

An oxygen-curable substance can be used in the composition of the invention. The oxygen-curable substance is, for example, an unsaturated compound capable of reacting with oxygen in the air and, upon reaction with oxygen in the air, it forms a cured film in the vicinity of the surface of the cured products to prevent the surface tackiness and the adhesion of dirt and dust to the cured product surface. As specific examples of the oxygen-curable substance, there may be mentioned, among others, drying oils, typically tung oil and linseed oil, various alkyd resins obtained by modification of such compounds; drying oil-modified acrylic polymers, epoxy resins, silicone resins; liquid polymers such as 1,2-polybutadiene, 1,4-polybutadiene and $C_5$-$C_8$ diene polymers as obtained by polymerization or copolymerization of diene compounds such as butadiene, chloroprene, isoprene and 1,3-pentadiene, liquid copolymers, such as NBR and SBR, obtained by copolymerization of such diene compounds and monomers copolymerizable with the diene compounds, for example acrylonitrile and styrene, so that the diene compounds may be predominant, and, further, various modifications thereof (maleinated modifications, boiled oil modifications, etc.). These may be used singly or two or more of them may be used in combination. Among these, tung oil and liquid diene polymers are particularly preferred. In some cases, the effect may be enhanced by the combined use of a catalyst or metal-based drier which promotes the oxidative curing reaction. As examples of such catalyst or metal-based drier, there may be mentioned cobalt naphthenate, lead naphthenate, zirconium naphthenate, cobalt octylate, zirconium octylate and like metal salts, and amine compounds. The level of addition of the oxygen-curable substance is preferably within the range of 0.1 to 20 parts by weight, more preferably 1 to 10 parts by weight, per 100 parts of the sum of the reactive silyl group-containing polymer (A) and reactive silyl group-containing polymer (B). At levels below 0.1 part by weight, the stain resistance will not be improved to a satisfactory extent and, at levels exceeding 20 parts by weight, the tensile characteristics of the cured products, among others, tend to be deteriorated. It is recommended that the oxygen-curable substance be used in combination with the photocurable substance, as described in Japanese Kokai Publication Hei03-160053.

An antioxidant (antiaging agent) can be used in the composition of the invention. The use of an antioxidant can increase the weather resistance of the cured products. Preferred as the antioxidant are hindered phenols, monophenols, bisphenols and polyphenols. Among them, hindered phenols are particularly preferred. Likewise, hindered amine light stabilizers can also be used. Specific examples of such antioxidants are described also in Japanese Kokai Publication Hei04-283259 and Japanese Kokai Publication Hei09-194731. The level of addition of the antioxidant is preferably within the range of 0.1 to 10 parts by weight, more preferably 0.2 to 5 parts by weight, per 100 parts by weight of the sum of the reactive silyl group-containing organic polymer (A) and reactive silyl group-containing organic polymer (B).

Alight stabilizer can be used in the composition of the invention. The use of a light stabilizer makes it possible to prevent the cured products from deterioration due to photooxidation. As examples of the light stabilizer, there may be mentioned benzotriazole, hindered amine, benzoate compounds and the like, and hindered amine type ones are particularly preferred. The level of addition of the light stabilizer is preferably within the range of 0.1 to 10 parts by weight, more preferably 0.2 to 5 parts by weight, per 100 parts by weight of the sum of the reactive silyl group-containing organic polymer (A) and reactive silyl group-containing organic polymer (B). Specific examples of the light stabilizer are described in Japanese Kokai Publication Hei09-194731 as well.

When a photocurable substance is additionally used in the composition of the invention, in particular when an unsaturated acrylic compound is used, the use of a tertiary amine moiety-containing hindered amine light stabilizer as the hindered amine light stabilizer is preferred so that the storage stability of the composition may be improved, as described in Japanese Kokai Publication Hei05-70531.

An ultraviolet absorber can be used in the composition of the invention. By using an ultraviolet absorber, it becomes possible to increase the surface weather resistance of the cured products. As examples of the ultraviolet stabilizer, there may be mentioned benzophenone, benzotriazole, salicylate, substituted tolyl, metal chelate compounds and the like, and benzotriazole type ones are particularly preferred. The level of addition of the ultraviolet stabilizer is preferably within the range of 0.1 to 10 parts by weight, more preferably 0.2 to 5 parts by weight, per 100 parts by weight of the sum of the reactive silyl group-containing organic polymer (A) and reactive silyl group-containing organic polymer (B). The combined use of a phenolic or hindered phenol antioxidant, a hindered amine light stabilizer and a benzotriazole ultraviolet absorber is preferred.

The composition of the invention may be supplemented with an epoxy resin and used as an elastic adhesive or the like. The epoxy resin mentioned just above includes but is not limited to epichlorohydrin-bisphenol A type epoxy resin, epichlorohydrin-bisphenol F type epoxy resin, tetrabromobisphenol A glycidyl ether and other fire-retardant epoxy resins, novolak type epoxy resin, hydrogenated bisphenol A type epoxy resin, bisphenol A-propylene oxide adduct glycidyl ether type epoxy resin, p-hydroxybenzoic acid glycidyl ether ester epoxy resin, m-aminophenol epoxy resin, diaminodiphenylmethane epoxy resin, urethane-modified epoxy resin, various alicyclic epoxy resins, N,N-diglycidylaniline, N,N-diglycidyl-o-toluidine, triglycidyl isocyanurate, polyalkylene glycol diglycidyl ethers, glycerin or other polyhydric alcohol glycidyl ethers, hydantoin epoxy resins, and unsaturated polymer epoxides such as petroleum resin. Thus, any of the common epoxy resins can be used. The epoxy resin having at least 2 epoxy groups within the molecule is preferred partly because it is highly reactive in curing and partly because it is more likely to give a three-dimensional network on curing. As further preferred examples, bishphenol A type epoxy resin and novolak type epoxy resin can be mentioned. The amount of use of such epoxy resin based on a combined total weight of 100 parts by weight of the reactive silyl group-containing organic polymer (A) and reactive silyl group-containing organic polymer (B) is ((A)+(B))/epoxy resin=100/1 to 1/100 by weight. If the ((A)+(B))/epoxy resin ratio is less than 1/100, the improving effect on impact strength and toughness of the cured epoxy resin, due to the ((A)+(B)) components, will hardly be obtained. If the ((A)+(B))/epoxy resin ratio exceeds 100/1, the improvement on the strength of the ((A)+(B))-cured products, due to the epoxy resins, will be insufficient. The preferred ratio varies according to uses of the curable resin composition and other factors and cannot be stated in general terms but when, for example, it is desired to improve the impact resistance, flexibility, toughness, peel strength, etc. of the cured epoxy resin, it is recommendable to use 1 to 100 parts by weight, preferably 5 to 100 parts by weight of ((A) component+(B) component) relative to 100 parts by weight of epoxy resin. On the other hand, when it is desired to improve the strength of cured ((A) component+(B) component), it is recommendable to use 1 to 200 parts by weight, preferably 5 to 100 parts by weight, of the epoxy resin relative to 100 parts by weight of ((A) component+(B) component).

When an epoxy resin is used, a curing agent for curing the epoxy resin can be used in combination. The curing agent for epoxy resin that can be used is not particularly restricted but includes the common curing agents for epoxy resin. Specifically, there can be mentioned primary or secondary amines such as triethylenetetramine, tetraethylenepentamine, diethylaminopropylamine, N-aminoethylpiperidine, m-xylylenediamine, m-phenylenediamine, diaminodiphenylmethane, diaminodiphenylsulfone, isophoronediamine, amine-terminated polyethers, etc.; tertiary amines such as 2,4,6-tris(dimethylaminomethyl)phenol, tripropylamine, etc.; salts of these tertiary amines; polyamide resins; imidazoles; dicyandiamides; boron trifluoride complex compounds, carboxylic acid anhydrides such as phthalic anhydride, hexahydrophthalic anhydride, tetrahydrophthalic anhydride, dodecinylsuccinic anhydride, pyromellitic anhydride, chlorenic anhydride, etc.; alcohols; phenols; carboxylic acids; aluminum or zirconium diketone complex compounds, and so forth. These curing agents may also be used each independently or in a combination of two or more species.

When a curing agent for epoxy resin is used, its amount of use is 0.1 to 300 parts by weight based on 100 parts by weight of the epoxy resin.

A ketimine can be used as the curing agent for epoxy resin. The ketimine remains stable in the absence of moisture but decomposes into a primary amine and a ketone by the presence of moisture and the primary amine thus produced functions as a room temperature-curable curing agent for epoxy resin. With a ketimine, a one-package type composition can be provided. The ketimine can be obtained by the condensation reaction between an amine compound and a carbonyl compound.

For synthesizing ketimines, the known amine compounds and carbonyl compounds can be used. Thus, for example, the amine compound which can be used includes diamines such as ethylenediamine, propylenediamine, trimethylenediamine, tetramethylenediamine, 1,3-diaminobutane, 2,3-diaminobutane, pentamethylenediamine, 2,4-diaminopentane, hexamethylenediamine, p-phenylenediamine, p,p'-biphenylenediamine, etc.; polyamines such as 1,2,3-triaminopropane, triaminobenzene, tris(2-aminoethyl)amine, tetra(aminomethyl)methane, etc.; polyalkylenepolyamines such as diethylenetriamine, triethylenetetramine, tetraethylenepentamine, etc.; polyoxyalkylene polyamines; and aminosilanes such as γ-aminopropyltriethoxysilane, N-(β-aminoethyl)-γ-aminopropyltrimethoxysilane, N-(β-aminoethyl)-γ-aminopropylmethyldimethoxysilane, etc.; among others. The carbonyl compound which can be used includes aldehydes such as acetaldehyde, propionaldehyde, n-butyraldehyde, isobutyraldehyde, diethylacetaldehyde, glyoxal, benzaldehyde, etc.; cyclic ketones such as cyclopentanone, trimethylcyclopentanone, cyclohexanone, trimethylcyclohexanone, etc.; aliphatic ketones such as acetone, methyl ethyl ketone, methyl propyl ketone, methyl isopropyl ketone, methyl isobutyl ketone, diethyl ketone, dipropyl ketone, diisopropyl ketone, dibutyl ketone, diisobutyl ketone, etc.; and β-dicarbonyl compounds such as acetylacetone, methyl acetoacetate, ethyl acetoacetate, dimethyl malonate, diethyl malonate, methyl ethyl malonate, dibenzoylmethane, and so forth.

In the case where an imino group is present in a ketimine, the imino group may be reacted with styrene oxide, a glycidyl ether such as butyl glycidyl ether, allyl glycidyl ether or the like, or a glycidyl ester. The ketimines mentioned above may be used each independently or in a combination of two or more species. The amount of use of the ketimine is 1 to 100 parts by weight relative to 100 parts by weight of the epoxy resin and varies with different species of epoxy resin and ketimine.

Where necessary, the curable composition of the invention may be supplemented with various additives for modulating various physical properties of the curable composition or those of the cured product. Among such additives are fire retardants, curability modulators, radical inhibitors, metal inactivators, ozone aging inhibitors, phosphorus type peroxide decomposers, lubricants, pigments, foaming agents, solvents, and antifungal agents, among others. Any of these additives may be used each independently or in a combination of two or more species. Specific examples of such additives, other than the examples thereof described herein, are described in, inter alia, Japanese Kokoku Publication Hei04-69659, Japanese Kokoku Publication Hei07-108928, Japanese Kokai Publication Sho63-254149, Japanese Kokai Publication Sho64-22904, and Japanese Kokai Publication 2001-72854.

The curable composition of the invention can be prepared in the form of a one-package system such that all the components are sealed into a single package and, after application, allowed to cure in situ in the presence of moisture in the air or in the form of a two-package system such that the curing catalyst, filler, plasticizer, water, etc. are formulated together in advance as a curing component and this formulated material is admixed with the polymer composition just before application.

In case the curable composition is prepared as a one-package system, where all the components are formulated in advance, it is recommendable to dehydrate/dry the moisture-containing components before formulating or dehydrate them by, for example, pressure reduction during the blending operation. In case the curable composition is prepared as a two-package system, it is not necessary to formulate a curing catalyst into the main package containing the reactive silyl group-containing polymer so that it is not likely that the presence of a minor amount of moisture in the formulated components will cause gelation but if a long-term shelf-life is desired, a dehydration/drying procedure is preferably carried out. The preferred procedure of dehydration/drying is drying by heating in the case of solids such as powders or vacuum drying or dehydration over synthetic zeolite, active alumina, silica gel or the like in the case of liquids. An alternative dehydration method comprises formulating a small amount of an isocyanate compound so as to let the isocyanato group react with water. In addition to such dehydration/drying procedures, the addition of a lower alcohol, such as methanol or ethanol, or an alkoxysilane compound, such as n-propyltrimethoxysilane, vinyltrimethoxysilane, vinylmethyldimethoxysilane, γ-mercaptopropylmethyldimethoxysilane, γ-mercaptopropylmethyldiethoxysilane, γ-glycidoxypropyltrimethoxysilane or the like, results in a further increase in shelf-life.

Dehydrators, particularly silicon compound reactive with water, such as vinyltrimethoxysilane, can be used in an amount within the range of 0.1 to 20 parts by weight, preferably 0.5 to 10 parts by weight, based on a combined total weight of 100 parts by weight of the reactive silyl group-containing organic polymer (A) and reactive silyl group-containing organic polymer (B).

The curable composition of the invention is particularly useful as an elastic sealant or adhesive and can be used as a sealing material or adhesive for use in buildings, ships, automobiles, roads and so forth. It is especially useful as a sealant for architectural use in those fields where it is required that the paint applied to the surface or the joint circumference should not be stained. In particular, it is useful as a siding board joint sealant and as a building stone joint sealant. Further, it can securely adhere to a wide range of substrates, such as glass, porcelain, wood, metal and resin molding substrates, either for itself or with the help of a primer, and, therefore, it can also be used in various types of adhesive compositions. In the adhesive field, it can be used not only as a common adhesive but also as a material for contact adhesives. Furthermore, it is useful also as a food packaging material, cast rubber material, template material or paint.

BEST MODES FOR CARRYING OUT THE INVENTION

The following examples illustrate the present invention. They are, however, by no means limitative of the scope of the invention. In the case of a hydroxyl group-containing oxyalkylene polymer, the number average molecular weight is determined in the following manner. Supposing that a hydroxyl group and an unsaturated group constitute the terminal structures, the hydroxyl group content is determined by the method in accordance with JIS K 1557 and the unsaturated group content by the method in accordance with JIS K 0070, and the molecular weight determined taking the number of initiator terminals into consideration is defined as the number average molecular weight. The molecular weight distribution (Mw/Mn) was determined using a GPC (gel permeation chromatography) analyzer with tetrahydrofuran as a solvent.

The viscosity was measured at 23° C. using a type B viscometer.

On the occasion of hydrosilane compound introduction into allyl-terminated polyoxypropylene, the progress of the reaction was confirmed by $^1$H-NMR, namely based on the intensity decreases in and disappearance of terminal allyl group-due peaks (4.97 ppm: =CH$_2$, 5.79 ppm: —CH=C) and the decrease in the hydrosilyl group (Si—H)-due peak intensity (about 4.6 ppm) of the hydrosilane compound added dropwise.

Synthesis Example 1

Synthesis of a Reactive Silyl Group-Containing Polyoxypropylene (A1)

A pressure-resisting glass reactor equipped with a stirrer was charged with 500 g of an allyl-terminated straight-chain poly(propylene oxide) having a number average molecular weight of 10,000 and Mw/Mn of 1.15 and comprising a main chain skeleton obtained by using a double metal cyanide complex catalyst and 10 g of hexane and azeotropic dehydration was carried out at 90° C. The hexane was then distilled off under reduced pressure, and after nitrogen purging, 20 μl of a chloroplatinic acid catalyst (5 wt. % as platinum in isopropyl alcohol) was added and, under stirring, 15.0 g of TES (triethoxysilane) was gently added dropwise. This mixture was reacted at 90° C. for 2 hours, after which the unreacted TES was distilled off under reduced pressure to recover a polymer (A1) having 1.6 triethoxysilyl groups on average per molecule. The viscosity (23° C.; as measured with a type B viscometer) thereof was 6.3 Pa·s.

Synthesis Example 2

Synthesis of a Reactive Silyl Group-Containing Polyoxypropylene (A2)

A pressure-resisting glass reactor equipped with a stirrer was charged with 500 g of an allyl-terminated straight-chain poly(propylene oxide) having a number average molecular weight of 10,000 and Mw/Mn of 1.15 and comprising a main chain skeleton obtained by using a double metal cyanide complex catalyst and 10 g of hexane and azeotropic dehydration was carried out at 90° C. The hexane was then distilled off under reduced pressure, and after nitrogen purging, 20 μl of a chloroplatinic acid catalyst (5 wt. % as platinum in isopropyl alcohol) was added and, under stirring, 12.0 g of DMS (dimethoxymethylsilane) was gently added dropwise. This mixture was reacted at 90° C. for 2 hours, after which the unreacted DMS was distilled off under reduced pressure to recover a polymer (A2) having 1.6 dimethoxysilyl groups on average per molecule. The viscosity (23° C.; as measured with a type B viscometer) thereof was 6.4 Pa·s.

Synthesis Example 3

Synthesis of a Reactive Silyl Group-Containing Polyoxypropylene (A3)

A pressure-resisting glass reactor equipped with a stirrer was charged with 500 g of an allyl-terminated straight-chain poly(propylene oxide) having a number average molecular weight of 17,000 and Mw/Mn of 1.20 and comprising a main chain skeleton obtained by using a double metal cyanide complex catalyst and 10 g of hexane and azeotropic dehydration was carried out at 90° C. The hexane was then distilled off under reduced pressure, and after nitrogen purging, 20 μl of a chloroplatinic acid catalyst (5 wt. % as platinum in isopropyl alcohol) was added and, under stirring, 14.2 g of the trimethoxysilane compound represented by the following formula was gently added dropwise.

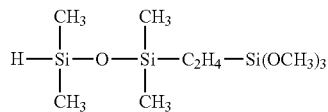

This mixture was reacted at 90° C. for 2 hours, after which the unreacted component was distilled off under reduced pressure to recover a polymer (A3) having 1.6 trimethoxysilyl groups on average per molecule. The viscosity (23° C.; as measured with a type B viscometer) thereof was 28.5 Pa·s.

Synthesis Example 4

Synthesis of a Reactive Silyl Group-Containing Polyoxypropylene (A4)

A pressure-resisting glass reactor equipped with a stirrer was charged with 500 g of an allyl-terminated straight-chain poly(propylene oxide) having a number average molecular weight of 17,000 and Mw/Mn of 1.20 and comprising a main chain skeleton obtained by using a double metal cyanide complex catalyst and 10 g of hexane and azeotropic dehydration was carried out at 90° C. The hexane was then distilled off under reduced pressure, and after nitrogen purging, 20 μl of a chloroplatinic acid catalyst (5 wt. % as platinum in isopropyl alcohol) was added and, under stirring, 4.0 g of DMS (dimethoxymethylsilane) was gently added dropwise. This mixture was reacted at 90° C. for 2 hours, after which the unreacted DMS was distilled off under reduced pressure to recover a polymer (A4) having 1.2 dimethoxysilyl groups on average per molecule. The viscosity (23° C.; as measured with a type B viscometer) thereof was 28.5 Pa·s.

Synthesis Example 5

Synthesis of a Reactive Silyl Group-Containing Polyoxypropylene (A5)

A pressure-resisting glass reactor equipped with a stirrer was charged with 500 g of a hydroxy-terminated straight-chain poly(propylene oxide) having a number average molecular weight of 10,000 and Mw/Mn of 1.15 and comprising a main chain skeleton obtained by using a double metal cyanide complex catalyst and 10 g of hexane and azeotropic dehydration was carried out at 90° C. The hexane was then distilled off under reduced pressure, and after nitrogen purging, 17.9 g of γ-isocyanatopropyltrimethoxysilane was added dropwise under stirring. This mixture was reacted at 90° C. for 4 hours to recover a polymer (A5) having 1.6 trimethoxysilyl groups on average per molecule. The viscosity (23° C.; as measured with a type B viscometer) thereof was 9.8 Pa·s.

Synthesis Example 6

Synthesis of a Reactive Silyl Group-Containing Polyoxypropylene (A6)

A pressure-resisting glass reactor equipped with a stirrer was charged with 500 g of a hydroxy-terminated straight-chain poly(propylene oxide) having a number average molecular weight of 17,000 and Mw/Mn of 1.20 and comprising a main chain skeleton obtained by using a double metal cyanide complex catalyst and 10 g of hexane and azeotropic dehydration was carried out at 90° C. The hexane was then distilled off under reduced pressure, and after nitrogen purging, 10.4 g of γ-isocyanatopropyltrimethoxysilane was added dropwise under stirring. This mixture was reacted at 90° C. for 4 hours to recover a polymer (A6) having 1.6 trimethoxysilyl groups on average per molecule. The viscosity (23° C.; as measured with a type B viscometer) thereof was 76.0 Pa·s.

Synthesis Example 7

Synthesis of a Low Functionalized Reactive Silyl Group-Containing Polyoxypropylene (B1)

An autoclave was charged with 0.16 g of zinc hexacyanocobaltate-glyme complex as an epoxide polymerization catalyst, 420 g of polyoxypropylene containing a terminal alkoxy group and a hydroxyl group (product of Sanyo Chemical Industries Ltd.: NEWPOL LB 285) as a polymerization initiator and 50 g of propylene oxide for catalyst activation, and the mixture was heated at 100° C. to thereby allow the polymerization reaction to proceed. After the induction period, the reactant temperature rose rapidly and then dropped. After confirmation of the reactant temperature fall, an additional 524-g portion of propylene oxide was added dropwise over about 3 hours, while the inside temperature was maintained at 100 to 110° C. After completion of the dropping, the heating was further continued for 1 hour and then a slight amount of the unreacted monomer was removed by degassing under reduced pressure. Thus was obtained a polyoxypropylene polymer containing a terminal alkoxy group and a hydroxyl group in each molecule was obtained. The polymer obtained had a number average molecular weight of 3,000 and the ratio Mw/Mn was 1.13.

Then, 7.8 parts by weight of sodium methoxide (30% solution in methanol) was added to 100 parts by weight of the above-obtained polyoxypropylene polymer containing a terminal alkoxy group and a hydroxyl group in each molecule, and the methanol was removed at 130° C. under reduced pressure for 2 hours. Then, 4.1 parts by weigh of allyl chloride was added and the reaction was allowed to proceed at that temperature for 2 hours. Thereafter, the unreacted allyl chloride was removed under reduced pressure.

The polymer obtained was cooled, diluted with hexane, and thoroughly washed with water to remove sodium chloride. Then, the hexane was removed, and a polyoxypropylene polymer containing a terminal alkoxy group and an allyl group was obtained.

The polymer obtained had an unsaturated group equivalent of 0.415 mmol/g as determined by iodometry.

To 100 parts weight of the above-obtained polyoxypropylene polymer having a terminal alkoxy group and an allyl group per molecule, 2 g of hexane was added, and azeotropic dehydration was carried out at 90° C. The hexane was then distilled off under reduced pressure, and after nitrogen purging, 20 μl of a chloroplatinic acid catalyst (5 wt. % as platinum in isopropyl alcohol) was added and, under stirring, 2.8 g of DMS (dimethoxymethylsilane) was gently added dropwise. This mixture was reacted at 90° C. for 2 hours, after which the unreacted DMS was distilled off under reduced pressure to recover a polymer (B1) having substantially 0.8 dimethoxymethylsilyl groups on average per molecule. The viscosity (23° C.; as measured with a type B viscometer) thereof was 0.6 Pa·s.

Synthesis Example 8

Synthesis of a Low Functionalized Reactive Silyl Group-Containing Polyoxypropylene (B2)

A pressure-resisting glass reactor equipped with a stirrer was charged with 500 g of an allyl-terminated straight-chain poly(propylene oxide) having a number average molecular weight of 3,000 and Mw/Mn of 1.14 and 10 g of hexane and azeotropic dehydration was carried out at 90° C. The hexane was then distilled off under reduced pressure, and after nitrogen purging, 20 µl of a chloroplatinic acid catalyst (5 wt. % as platinum in isopropyl alcohol) was added and, under stirring, 19.0 g of DMS (dimethoxymethylsilane) was gently added dropwise. This mixture was reacted at 90° C. for 2 hours, after which the unreacted DMS was distilled off under reduced pressure to recover a polymer (B2) having 1.0 methyldimethoxysilyl group on average per molecule. The viscosity (23° C.; as measured with a type B viscometer) thereof was 0.5 Pa·s.

Synthesis Example 9

Synthesis of a Reactive Silyl Group-Containing Hydrocarbon Compound (B3)

1-Octadecene (100 g) and 4 g of hexane were weighed in a 500-ml three-necked flask, the flask was equipped with a vacuum-sealed stirrer, a three-way cock and a ball stopper and, after azeotropic dehydration at 80° C. under reduce pressure, 20 g of dioxane and 12.7 µl of platinum-1,1,3,3-tetramethyl-1,3-divinyldisiloxane complex (3 wt. % as platinum in toluene) were added dropwise, followed by thorough stirring. Then, 42.2 g of methydimethoxysilane was gently added dropwise in a nitrogen atmosphere and, thereafter, the resulting mixture was stirred until disappearance of the terminal unsaturated group. The progress of the reaction was confirmed by $^1$H-NMR, namely based on the intensity decreases in and disappearance of terminal unsaturated group-due peaks (about 4.9 ppm: =$CH_2$, about 5.8 ppm: —CH=C) and the decrease in the hydrosilyl group (Si—H)-due peak intensity (about 4.6 ppm) of the hydrosilane compound added dropwise.

Upon $^1$H-NMR measurement of the reaction product obtained, the above-mentioned unsaturated group-due peaks and hydrosilane-due peak were found to have disappeared to a sufficient extent as compared with the initial terminal unsaturated group-containing compound and, further, a peak due to the methylene group adjacent to the silyl group (about 0.6 ppm: —$CH_2$—Si) was confirmed. Thus, methyldimethoxysilyl group-terminated octadecane (B3) was obtained. The methyldimethoxysilyl group introduction percentage was calculated based on the peak intensity decreases and increase and found to be about 90%.

Synthesis Example 10

Synthesis of a Low Functionalized Reactive Silyl Group-Containing Polyoxypropylene (B4)

The same procedure as in the Synthesis Example 7 was carried out, and a polyoxypropylene polymer containing a terminal alkoxy group and a hydroxyl group in each molecule, having a number average molecular weight of 3,000 and the ratio Mw/Mn of 1.13, was obtained.

Then, in the same procedure as in the Synthesis Example 7, 7.8 parts by weight of sodium methoxide (30% solution in methanol) was added to 100 parts by weight of the above-obtained polyoxypropylene polymer containing a terminal alkoxy group and a hydroxyl group in each molecule, and the methanol was removed at 130° C. under reduced pressure for 2 hours. Then, 4.1 parts by weigh of allyl chloride was added and the reaction was allowed to proceed at that temperature for 2 hours. Thereafter, the unreacted allyl chloride was removed under reduced pressure.

The polymer obtained was cooled, diluted with hexane, and thoroughly washed with water to remove sodium chloride. Then, the hexane was removed, and a polyoxypropylene polymer containing a terminal alkoxy group and an allyl group was obtained.

The polymer obtained had an unsaturated group equivalent of 0.415 mmol/g as determined by iodometry.

To 100 parts weight of the above-obtained polyoxypropylene polymer having a terminal alkoxy group and an allyl group per molecule, 2 g of hexane was added, and azeotropic dehydration was carried out at 90° C. The hexane was then distilled off under reduced pressure, and after nitrogen purging, 20 µl of a chloroplatinic acid catalyst (5 wt. % as platinum in isopropyl alcohol) was added and, under stirring, 7.5 g of the trimethoxysilane compound represented by the above formula [1] was gently added dropwise. This mixture was reacted at 90° C. for 2 hours, after which the unreacted component(s) was distilled off under reduced pressure to recover a polymer (B4) having substantially 0.8 trimethoxysilyl groups on average per molecule. The viscosity (23° C.; as measured with a type B viscometer) thereof was 0.6 Pa·s.

Synthesis Example 11

Synthesis of a Low Functionalized Reactive Silyl Group-Containing Polyoxypropylene (B5)

A pressure-resisting glass reactor equipped with a stirrer was charged with 500 g of an allyl-terminated straight-chain poly(propylene oxide) having a number average molecular weight of 11,000 and Mw/Mn of 1.17 and 10 g of hexane and azeotropic dehydration was carried out at 90° C. The hexane was then distilled off under reduced pressure, and after nitrogen purging, 20 µl of a chloroplatinic acid catalyst (5 wt. % as platinum in isopropyl alcohol) was added and, under stirring, 6.5 g of DMS (dimethoxymethylsilane) was gently added dropwise. This mixture was reacted at 90° C. for 2 hours, after which the unreacted DMS was distilled off under reduced pressure to recover a polymer (B5) having 1.3 methyldimethoxysilyl groups on average per molecule. The viscosity (23° C.; as measured with a type B viscometer) thereof was 8.0 Pa·s.

Synthesis Example 12

Synthesis of a Reactive Silyl Group-Containing Polyoxypropylene (B6)

A pressure-resisting glass reactor equipped with a stirrer was charged with 500 g of an allyl-terminated straight-chain poly(propylene oxide) having a number average molecular weight of 3,000 and Mw/Mn of 1.14 and 10 g of hexane and azeotropic dehydration was carried out at 90° C. The hexane was then distilled off under reduced pressure, and after nitrogen purging, 20 µl of a chloroplatinic acid catalyst (5 wt. % as platinum in isopropyl alcohol) was added and, under stirring, 30.0 g of DMS (dimethoxymethylsilane) was gently added dropwise. This mixture was reacted at 90° C. for 2 hours, after which the unreacted DMS was distilled off under reduced pressure to recover a polymer (B6) having 1.6 methyldimethoxysilyl group on average per molecule. The viscosity (23° C.; as measured with a type B viscometer) thereof was 0.6 Pa·s.

Synthesis Example 13

Synthesis of a Reactive Silyl Group-Containing Polyoxypropylene (B7)

A pressure-resisting glass reactor equipped with a stirrer was charged with 500 g of an allyl-terminated branched-chain poly(propylene oxide) having a number average molecular weight of 13,000 and Mw/Mn of 1.80 and 10 g of hexane and azeotropic dehydration was carried out at 90° C. The hexane was then distilled off under reduced pressure, and after nitrogen purging, 20 μl of a chloroplatinic acid catalyst (5 wt. % as platinum in isopropyl alcohol) was added and, under stirring, 8.3 g of DMS (dimethoxymethylsilane) was gently added dropwise. This mixture was reacted at 90° C. for 2 hours, after which the unreacted DMS was distilled off under reduced pressure to recover a polymer (B7) having 1.8 methyldimethoxysilyl group on average per molecule. The viscosity (23° C.; as measured with a type B viscometer) thereof was 26.0 Pa·s.

Measurements of the viscosity of each curable composition and mechanical characteristic of each cured product Example 1

The reactive silyl group-containing polyoxypropylene polymer (A1) obtained in Synthesis Example 1 (85 parts by weight) and 15 parts by weight of the low functionalized reactive silyl group-containing polyoxypropylene (B1) obtained in Synthesis Example 5 were mixed up by kneading. The resulting mixed composition had a viscosity of 4.4 Pa·s. Further, this mixed composition was supplemented with 120 parts by weight of calcium carbonate, 20 parts by weight of titanium oxide, 55 parts by weight of polypropylene glycol, 2 parts by weight of vinyltrimethoxysilane, 3 parts by weight of N-(β-aminoethyl)-γ-aminopropyltrimethoxysilane and 2 parts by weight of dibutyltin bisacetylacetonate and the whole mixture was thoroughly kneaded to give a curable composition, and the curable composition was subjected to the following tests.

Dumbbell Tensile Characteristics

Using the curable composition, 3-mm-thick sheets were prepared and cured by 3 days of curing at 23° C. and 50% humidity and further cured in an oven at 50° C. for 4 days. The sheets were then allowed to cool to room temperature, and JIS No. 3 dumbbell specimens were punched out therefrom and measured for stress at 100% extension (M100), strength at break (Tb) and elongation at break (Eb) at a pulling rate of 200 mm/min using an autograph.

Recovery

In the same manner as mentioned above, 3-mm-thick sheets were prepared and, after curing, JIS No. 3 dumbbell specimens were punched out therefrom. The mark-to-mark portion (2 cm) of each dumbbell punched out was stretched by 100% and, after 24 hours of maintenance of stretching at 23° C., the specimen was released from stretching and, after allowing them to stand for 1 hour, the mark-to-mark distance (x cm) was measured. The recovery percentage was calculated as follows:

Recovery (%)=(4−x)/2×100

The results are shown in Table 1.

TABLE 1

| | | Number average molecular weight | Mw/Mn | Number of Si/molecule | Reactive silyl group structure | Example 1 | Example 2 | Example 3 | Example 4 | Example 5 | Example 6 |
|---|---|---|---|---|---|---|---|---|---|---|---|
| Organic polymer | A1 | 10000 | 1.15 | 1.6 | Trimethoxysilyl group | 85 | 70 | 70 | 70 | | |
| | A2 | 10000 | 1.15 | 1.6 | Dimethoxysilyl group | | | | | | |
| | A3 | 17000 | 1.20 | 1.6 | Trimethoxysilyl group | | | | | 70 | |
| | A4 | 17000 | 1.20 | 1.2 | Dimethoxysilyl group | | | | | | |
| | A5 | 10000 | 1.15 | 1.6 | Trimethoxysilyl group | | | | | | 70 |
| | A6 | 17000 | 1.20 | 1.6 | Trimethoxysilyl group | | | | | | |
| | B1 | 3000 | 1.13 | 0.8 | Dimethoxysilyl group | 15 | 30 | 30 | | 30 | 30 |
| | B2 | 3000 | 1.14 | 1 | Dimethoxysilyl group | | | | 30 | | |
| | B3 | 350 | 1.03 | 0.9 | Dimethoxysilyl group | | | | | | |
| | B4 | 3000 | 1.13 | 0.8 | Trimethoxysilyl group | | | | | | |
| | B5 | 3000 | 1.14 | 1.6 | Dimethoxysilyl group | | | | | | |
| | B6 | 11000 | 1.17 | 1.3 | Dimethoxysilyl group | | | | | | |
| | B7 | 13000 | 1.80 | 1.8 | Dimethoxysilyl group | | | | | | |
| Calcium carbonate | | | | | | 120 | 120 | 120 | 120 | 120 | 120 |
| Titanium oxide | | | | | | 20 | 20 | 20 | 20 | 20 | 20 |
| Polypropylene glycol | | | | | | 55 | 55 | 55 | 55 | 55 | 55 |
| Vinyltrimethoxysilane | | | | | | 2 | 2 | 2 | 2 | 2 | 2 |
| N-(β-aminoethyl)-γ-aminopropyltrimethoxysilane | | | | | | 3 | 3 | 3 | 3 | 3 | 3 |
| Dibutyltin bisacetylacetonate | | | | | | 2 | 2 | 0.1 | 2 | 0.2 | 0.1 |
| Viscosity of organic polymer (23° C.) (Pa·s) | | | | | | 4.4 | 3.1 | 3.1 | 2.9 | 9.3 | 4.3 |
| Dumbbell property | | | | | M50 (MPa) | 0.37 | 0.24 | 0.28 | 0.36 | 0.11 | 0.25 |
| | | | | | M100 (MPa) | 0.69 | 0.45 | 0.54 | 0.67 | 0.19 | 0.52 |
| | | | | | Tb (MPa) | 1.75 | 1.57 | 1.50 | 1.53 | 1.16 | 1.28 |
| | | | | | Eb (%) | 340 | 480 | 353 | 341 | 733 | 273 |
| Recovery (%) | | | | | | 95 | 92 | 94 | 90 | 88 | 94 |

Examples 2 to 12 and Comparative Examples 1 to 10

According to the formulations given in Table 1, the component (A) and component (B) were mixed up and the resulting compositions were subjected to viscosity measurement in the same manner as in Example 1. Further, like in Example 1, each mixed composition was supplemented with 120 parts by weight of calcium carbonate, 20 parts by weight of titanium oxide, 55 parts by weight of polypropylene glycol, 2 parts by weight of vinyltrimethoxysilane, 3 parts by weight of N-(β-aminoethyl)-γ-aminopropyltrimethoxysilane and 2 parts or 0.1 part by weight of dibutyltin bisacetylacetonate and the whole mixture was thoroughly kneaded to give a curable composition, which was subjected to dumbbell tensile testing and recovery evaluation. The results obtained for the Examples are shown in Table 1 and Table 2, and the results for the Comparative Examples in Table 3 and Table 4. The relations between modulus (M100) and recovery are shown in FIG. 1.

TABLE 2

|  |  | Number average molecular weight | Mw/Mn | Number of Si/molecule | Reactive silyl group structure | Example 7 | Example 8 | Example 9 | Example 10 | Example 11 | Example 12 |
|---|---|---|---|---|---|---|---|---|---|---|---|
| Organic polymer | A1 | 10000 | 1.15 | 1.6 | Trimethoxysilyl group |  |  |  | 70 |  | 90 |
|  | A2 | 10000 | 1.15 | 1.6 | Dimethoxysilyl group |  |  |  |  |  |  |
|  | A3 | 17000 | 1.20 | 1.6 | Trimethoxysilyl group |  |  |  |  | 70 |  |
|  | A4 | 17000 | 1.20 | 1.2 | Dimethoxysilyl group |  |  |  |  |  |  |
|  | A5 | 10000 | 1.15 | 1.6 | Trimethoxysilyl group | 70 |  |  |  |  |  |
|  | A6 | 17000 | 1.20 | 1.6 | Trimethoxysilyl group |  | 70 | 70 |  |  |  |
|  | B1 | 3000 | 1.13 | 0.8 | Dimethoxysilyl group |  | 30 |  |  |  |  |
|  | B2 | 3000 | 1.14 | 1 | Dimethoxysilyl group | 30 |  |  |  |  |  |
|  | B3 | 350 | 1.03 | 0.9 | Dimethoxysilyl group |  |  |  |  |  | 10 |
|  | B4 | 3000 | 1.13 | 0.8 | Trimethoxysilyl group |  |  |  | 30 | 30 |  |
|  | B5 | 3000 | 1.14 | 1.6 | Dimethoxysilyl group |  |  |  |  |  |  |
|  | B6 | 11000 | 1.17 | 1.3 | Dimethoxysilyl group |  |  | 30 |  |  |  |
|  | B7 | 13000 | 1.80 | 1.8 | Dimethoxysilyl group |  |  |  |  |  |  |
| Calcium carbonate |  |  |  |  |  | 120 | 120 | 120 | 120 | 120 | 120 |
| Titanium oxide |  |  |  |  |  | 20 | 20 | 20 | 20 | 20 | 20 |
| Polypropylene glycol |  |  |  |  |  | 55 | 55 | 55 | 55 | 55 | 55 |
| Vinyltrimethoxysilane |  |  |  |  |  | 2 | 2 | 2 | 2 | 2 | 2 |
| N-(β-aminoethyl)-γ-aminopropyltrimethoxysilane |  |  |  |  |  | 3 | 3 | 3 | 3 | 3 | 3 |
| Dibutyltin bisacetylacetonate |  |  |  |  |  | 0.1 | 0.1 | 0.1 | 2 | 0.1 | 2 |
| Viscosity of organic polymer (23° C.)(Pa·s) |  |  |  |  |  | 4.2 | 18.2 | 38.7 | 3.3 | 9.9 | 3.0 |
| Dumbbell property |  |  |  |  | M50 (MPa) | 0.36 | 0.08 | 0.20 | 0.24 | 0.12 | 0.61 |
|  |  |  |  |  | M100 (MPa) | 0.70 | 0.16 | 0.37 | 0.45 | 0.20 | 0.99 |
|  |  |  |  |  | Tb (MPa) | 1.32 | 0.95 | 1.48 | 1.61 | 1.31 | 2.73 |
|  |  |  |  |  | Eb (%) | 207 | 682 | 456 | 498 | 727 | 433 |
| Recovery (%) |  |  |  |  |  | 95 | 87 | 89 | 94 | 90 | 96 |

TABLE 3

|  |  | Number average molecular weight | Mw/Mn | Number of Si/molecule | Reactive silyl group structure | Comparative Example 1 | Comparative Example 2 | Comparative Example 3 | Comparative Example 4 | Comparative Example 5 | Comparative Example 6 |
|---|---|---|---|---|---|---|---|---|---|---|---|
| Organic polymer | A1 | 10000 | 1.15 | 1.6 | Trimethoxysilyl group | 100 |  |  |  |  |  |
|  | A2 | 10000 | 1.15 | 1.6 | Dimethoxysilyl group |  | 100 | 100 |  | 85 | 70 |
|  | A3 | 17000 | 1.20 | 1.6 | Trimethoxysilyl group |  |  |  |  |  |  |
|  | A4 | 17000 | 1.20 | 1.2 | Dimethoxysilyl group |  |  |  | 100 |  |  |
|  | A5 | 10000 | 1.15 | 1.6 | Trimethoxysilyl group |  |  |  |  |  |  |
|  | A6 | 17000 | 1.20 | 1.6 | Trimethoxysilyl group |  |  |  |  |  |  |
|  | B1 | 3000 | 1.13 | 0.8 | Dimethoxysilyl group |  |  |  |  | 15 | 30 |
|  | B2 | 3000 | 1.14 | 1 | Dimethoxysilyl group |  |  |  |  |  |  |
|  | B3 | 350 | 1.03 | 0.9 | Dimethoxysilyl group |  |  |  |  |  |  |
|  | B4 | 3000 | 1.13 | 0.8 | Trimethoxysilyl group |  |  |  |  |  |  |
|  | B5 | 3000 | 1.14 | 1.6 | Dimethoxysilyl group |  |  |  |  |  |  |
|  | B6 | 11000 | 1.17 | 1.3 | Dimethoxysilyl group |  |  |  |  |  |  |
|  | B7 | 13000 | 1.80 | 1.8 | Dimethoxysilyl group |  |  |  |  |  |  |
| Calcium carbonate |  |  |  |  |  | 120 | 120 | 120 | 120 | 120 | 120 |
| Titanium oxide |  |  |  |  |  | 20 | 20 | 20 | 20 | 20 | 20 |
| Polypropylene glycol |  |  |  |  |  | 55 | 55 | 55 | 55 | 55 | 55 |
| Vinyltrimethoxysilane |  |  |  |  |  | 2 | 2 | 2 | 2 | 2 | 2 |
| N-(β-aminoethyl)-γ-aminopropyltrimethoxysilane |  |  |  |  |  | 3 | 3 | 3 | 3 | 3 | 3 |
| Dibutyltin bisacetylacetonate |  |  |  |  |  | 2 | 2 | 0.1 | 2 | 2 | 2 |
| Viscosity of organic polymer (23° C.)(Pa·s) |  |  |  |  |  | 6.3 | 6.4 | 6.4 | 28.5 | 4.5 | 3.1 |
| Dumbbell property |  |  |  |  | M50 (MPa) | 0.50 | 0.35 | 0.48 | 0.10 | 0.24 | 0.17 |
|  |  |  |  |  | M100 (MPa) | 0.87 | 0.62 | 0.85 | 0.17 | 0.42 | 0.30 |
|  |  |  |  |  | Tb (MPa) | 1.65 | 1.93 | 2.16 | 1.58 | 1.84 | 1.41 |
|  |  |  |  |  | Eb (%) | 231 | 452 | 350 | 1077 | 615 | 682 |
| Recovery (%) |  |  |  |  |  | 93 | 65 | 86 | 47 | 56 | 43 |

TABLE 4

| | | Number average molecular weight | Mw/Mn | Number of Si/molecule | Reactive silyl group structure | Comparative Example 7 | Comparative Example 8 | Comparative Example 9 | Comparative Example 10 |
|---|---|---|---|---|---|---|---|---|---|
| Organic polymer | A1 | 10000 | 1.15 | 1.6 | Trimethoxysilyl group | | | | |
| | A2 | 10000 | 1.15 | 1.6 | Dimethoxysilyl group | | | | 90 |
| | A3 | 17000 | 1.20 | 1.6 | Trimethoxysilyl group | | | | |
| | A4 | 17000 | 1.20 | 1.2 | Dimethoxysilyl group | | | | |
| | A5 | 10000 | 1.15 | 1.6 | Trimethoxysilyl group | 100 | 70 | 70 | |
| | A6 | 17000 | 1.20 | 1.6 | Trimethoxysilyl group | | | | |
| | B1 | 3000 | 1.13 | 0.8 | Dimethoxysilyl group | | | | |
| | B2 | 3000 | 1.14 | 1 | Dimethoxysilyl group | | | | |
| | B3 | 350 | 1.03 | 0.9 | Dimethoxysilyl group | | | | 10 |
| | B4 | 3000 | 1.13 | 0.8 | Trimethoxysilyl group | | | | |
| | B5 | 3000 | 1.14 | 1.6 | Dimethoxysilyl group | | 30 | | |
| | B6 | 11000 | 1.17 | 1.3 | Dimethoxysilyl group | | | | |
| | B7 | 13000 | 1.80 | 1.8 | Dimethoxysilyl group | | | 30 | |
| Calcium carbonate | | | | | | 120 | 120 | 120 | 120 |
| Titanium oxide | | | | | | 20 | 20 | 20 | 20 |
| Polypropylene glycol | | | | | | 55 | 55 | 55 | 55 |
| Vinyltrimethoxysilane | | | | | | 2 | 2 | 2 | 2 |
| N-(β-aminoethyl)-γ-aminopropyltrimethoxysilane | | | | | | 3 | 3 | 3 | 3 |
| Dibutyltin bisacetylacetonate | | | | | | 0.1 | 0.1 | 0.1 | 2 |
| Viscosity of organic polymer (23° C.)(Pa · s) | | | | | | 9.8 | 4.3 | 13.1 | 2.9 |
| Dumbbell property | | | | | M50 (MPa) | 0.45 | 0.57 | 0.45 | 0.45 |
| | | | | | M100 (MPa) | 0.87 | 1.15 | 0.86 | 0.80 |
| | | | | | Tb (MPa) | 1.53 | 1.47 | 1.52 | 3.12 |
| | | | | | Eb (%) | 193 | 147 | 216 | 620 |
| Recovery (%) | | | | | | 92 | 93 | 93 | 78 |

The results of Examples 1 to 12 and Comparative Examples 2 to 6 and 10 as shown in Tables 1 to 4 and FIG. 1 indicate that the mixed compositions comprising a trialkoxy group-containing polyoxypropylene polymer and a polyoxypropylene polymer containing, on average, 0.5 to 1.5 reactive silyl groups per molecule gave lower modulus and superior recovery values, hence had characteristics favorable for use as sealing materials, as compared with the mixed compositions comprising a dimethoxy group-containing polyoxypropylene polymer and a polyoxypropylene polymer containing, on average, 0.5 to 1.5 reactive silyl groups per molecule.

Further, it is seen that, in Examples 1 to 4, 10 and 12, as compared with Comparative Example 1, the recovery was retained but the modulus was lower (comparable in Example 12), the elongation ratio higher and the viscosity lower, thus each composition had characteristics favorable for use as a sealing material.

Furthermore, it is seen that, in Examples 6 and 7, the balance among recovery, viscosity, modulus and elongation was superior as compared with Comparative Examples 6 to 8.

To sum up, it is evident, from Tables 1 to 4 and FIG. 1, that curable compositions having characteristics suited for use as sealing materials or adhesives, namely high recovery, low modulus, high elongation and low viscosity, among others, can be provided by mixing a trialkoxy group-containing organic polymer and a low functionalized alkoxysilyl group-containing organic polymer together.

The invention claimed is:

1. A curable composition which comprises an organic polymer (A) containing reactive silyl groups represented by the general formula (1) given below wherein a is 3 and an organic polymer (B) containing an average of 0.5 to 1.0 reactive silyl groups represented by the general formula (1) given below per molecule;

$$-Si(R^1_{3-a})X_a \qquad (1)$$

wherein $R^1$ represents an alkyl group containing 1 to 20 carbon atoms, an aryl group containing 6 to 20 carbon atoms, an aralkyl group containing 7 to 20 carbon atoms or a triorganosiloxy group represented by $(R')_3SiO-$ (in which the three R' groups may be the same or different and each represents a monovalent hydrocarbon group containing 1 to 20 carbon atoms) and, when there are two or more $R^1$ groups, they may be the same or different, and X represents a hydroxyl group or a hydrolysable group and, when there are two or more X groups, they may be the same or different, and a represents 1, 2 or 3, and wherein the main chain of each of the organic polymers (A) and (B) is an oxyalkylene polymer, and the molecular weight of the organic polymer (B) is lower than the molecular weight of the organic polymer (A) by not less than 3,000, the organic polymer (B) contains no urethane bond or urea bond with in the molecule, and wherein the curable composition contains no organic polymer that has a vinyl polymer as a main chain skeleton.

2. A curable composition which comprises an organic polymer (A) containing reactive silyl groups represented by the general formula (1) given below wherein a is 3 and an organic polymer (B) containing an average of 0.5 to 1.0 reactive silyl groups represented by the general formula (1) given below per molecule $$-Si(R^1_{3-a})X_a \qquad (1)$$

wherein $R^1$ represents a alkyl group containing 1 to 20 carbon atoms, an aryl group containing 6 to 20 carbon atoms, an aralkyl group containing 7 to 20 carbon atoms or a triorganosiloxy group represented by $(R')_3SiO-$ (in which the three R' groups may be the same or different and each represents a monovalent hydrocarbon group containing 1 to 20 carbon atoms) and, when there are two or more $R^1$ groups, they may be the same or different, and X represents a hydroxyl group or a hydrolysable group and, when there are two or more X groups, they may be the same or different, and a represents 1, 2, or 3, and wherein the main chain of each of the organic polymers (A) and (B) is an oxyalkylene polymer, the molecular weight of the organic polymer (B) is lower than the molecular weight of the organic polymer (A) by not less that 3,000, the reactive silyl group in the organic polymer (B) is a reactive silyl group represented by the general formula (1) in which a is 2, and wherein the curable composition contains no organic polymer that has a vinyl polymer as a main chain skeleton.

3. The curable composition according to claim 1 wherein the reactive silyl group in the organic polymer (B) is a reactive silyl group represented by the general formula (1) in which a is 3.

4. The curable composition according to claim 1 wherein the organic polymer (B) is a polymer obtained by reacting the above-mentioned organic polymer with a compound containing both a functional group capable of reacting with the reactive group in the above-mentioned organic polymer and a reactive silyl group represented by the general formula (1) in a compound-to-polymer mole ratio of not lower than 0.5 and not higher than 1.0.

5. The curable composition according to claim 1 wherein the organic polymer (B) contains substantially one reactive silyl group represented by the general formula (1) per molecule.

6. The curable composition according to claim 1 wherein the organic polymer (B) has a molecular weight of not higher than 8,000.

7. The curable composition according to claim 1 wherein the organic polymer (A) contains no urethane bond or urea bond within the molecule.

8. The curable composition according to claim 2 wherein the organic polymer (B) is a polymer obtained by reacting the above-mentioned organic polymer with a compound containing both a functional group capable of reacting with the reactive group in the above-mentioned organic polymer and a reactive silyl group represented by the general formula (1) in a compound-to-polymer mole ratio of not lower than 0.5 and not higher than 1.0.

9. The curable composition according to claim 3 wherein the organic polymer (B) is a polymer obtained by reacting the above-mentioned organic polymer with a compound containing both a functional group capable of reacting with the reactive group in the above-mentioned organic polymer and a reactive silyl group represented by the general formula (1) in a compound-to-polymer mole ratio of not lower than 0.5 and not higher than 1.0.

10. The curable composition according to claim 2 wherein the organic polymer (B) contains substantially one reactive silyl group represented by the general formula (1) per molecule.

11. The curable composition according to claim 3 wherein the organic polymer (B) contains substantially one reactive silyl group represented by the general formula (1) per molecule.

12. The curable composition according to claim 4 wherein the organic polymer (B) contains substantially one reactive silyl group represented by the general formula (1) per molecule.

13. The curable composition according to claim 2 wherein the organic polymer (B) has a molecular weight of not higher than 8,000.

* * * * *